United States Patent
Harada et al.

(10) Patent No.: US 10,470,066 B2
(45) Date of Patent: Nov. 5, 2019

(54) RADIO BASE STATION, USER TERMINAL AND COMMUNICATION CONTROL METHOD

(71) Applicant: NTT DOCOMO, INC., Tokyo (JP)

(72) Inventors: Hiroki Harada, Tokyo (JP); Liu Liu, Beijing (CN); Qin Mu, Beijing (CN); Lan Chen, Beijing (CN); Lihui Wang, Beijing (CN); Yong Li, Beijing (CN); Mugen Peng, Beijing (CN); Wenbo Wang, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 46 days.

(21) Appl. No.: 15/024,865

(22) PCT Filed: Sep. 4, 2014

(86) PCT No.: PCT/JP2014/073285
§ 371 (c)(1),
(2) Date: Mar. 25, 2016

(87) PCT Pub. No.: WO2015/045773
PCT Pub. Date: Apr. 2, 2015

(65) Prior Publication Data
US 2016/0242061 A1    Aug. 18, 2016

(30) Foreign Application Priority Data
Sep. 26, 2013   (JP) ................... 2013-199190

(51) Int. Cl.
*H04W 24/10*    (2009.01)
*H04L 5/00*    (2006.01)
(Continued)

(52) U.S. Cl.
CPC ............. *H04W 24/10* (2013.01); *H04L 5/001* (2013.01); *H04L 5/0073* (2013.01);
(Continued)

(58) Field of Classification Search
CPC . H04W 28/04; H04W 24/00; H04W 72/0446; H04W 72/0413
(Continued)

(56) References Cited

U.S. PATENT DOCUMENTS 9,769,838 B2* 9/2017 You .................... H04L 5/001
2014/0328307 A1  11/2014 Takano
(Continued)

FOREIGN PATENT DOCUMENTS

JP    2012-005084 A    1/2012
JP    2012-529782 A    11/2012
(Continued)

OTHER PUBLICATIONS

Office Action issued in corresponding Japanese Application No. 2013-199190, dated Apr. 18, 2017 (8 pages).
(Continued)

*Primary Examiner* — Iqbal Zaidi
(74) *Attorney, Agent, or Firm* — Osha Liang LLP

(57) ABSTRACT

The present invention is designed so that, in a radio communication system in which a plurality of component carriers (CCs) are used in each small cell within a macro cell, the load of measurements, the amount of information to report and so on in user terminals are reduced. The macro base station of the present invention transmits, to a user terminal, measurement indication information that includes a measurement indication for the received power of a measurement signal of a specific CC in each small cell, and receives, from the user terminal, a measurement report that includes the received power of the measurement signal of the specific CC. Also, the macro base station calculates the received quality of the measurement signals of the plurality of CCs based on the received power of the measurement signal of the specific CC.

7 Claims, 23 Drawing Sheets

(51) Int. Cl.
*H04W 72/04* (2009.01)
*H04W 84/04* (2009.01)

(52) U.S. Cl.
CPC ......... *H04L 5/0098* (2013.01); *H04W 72/042* (2013.01); *H04W 72/0413* (2013.01); *H04L 5/005* (2013.01); *H04L 5/006* (2013.01); *H04L 5/0023* (2013.01); *H04L 5/0048* (2013.01); *H04L 5/0057* (2013.01); *H04W 84/045* (2013.01)

(58) Field of Classification Search
USPC .................................................. 370/216–339
See application file for complete search history.

(56) References Cited

U.S. PATENT DOCUMENTS

| | | | | |
|---|---|---|---|---|
| 2015/0003348 | A1* | 1/2015 | Ishii ................... | H04L 27/2601 370/329 |
| 2016/0295500 | A1* | 10/2016 | Liu ....................... | H04W 48/16 |
| 2017/0339660 | A1* | 11/2017 | Kazmi ................. | H04B 17/309 |
| 2018/0007574 | A1* | 1/2018 | Park ...................... | H04B 7/04 |

FOREIGN PATENT DOCUMENTS

| | | |
|---|---|---|
| WO | 2013040487 A1 | 3/2013 |
| WO | 2013111422 A1 | 8/2013 |

OTHER PUBLICATIONS

International Search Report issued in corresponding application No. PCT/JP2014/073285 dated Dec. 2, 2014 (4 pages).
Written Opinion of the International Searching Authority issued in corresponding application No. PCT/JP2014/073285 dated Dec. 2, 2014 (4 pages).
NTT DOCOMO, "Views on Benefit of Small Cell Discovery Based on Discovery Signal"; 3GPP TSG RAN WG1 Meeting #74, R1-133458; Barcelona, Spain, Aug. 19-23, 2013 (4 pages).
NTT DOCOMO, "Enhanced Cell Identification for Additional Carrier Type"; 3GPP TSG RAN WG1 Meeting #68, R1-120398; Dresden, Germany, Feb. 6-10, 2012 (4 pages).
3GPP TR 36.814 V9.0.0, "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (104 pages).
European Search Report issued in corresponding European Application No. 14849963.5, dated Mar. 27, 2017 (9 pages).

* cited by examiner

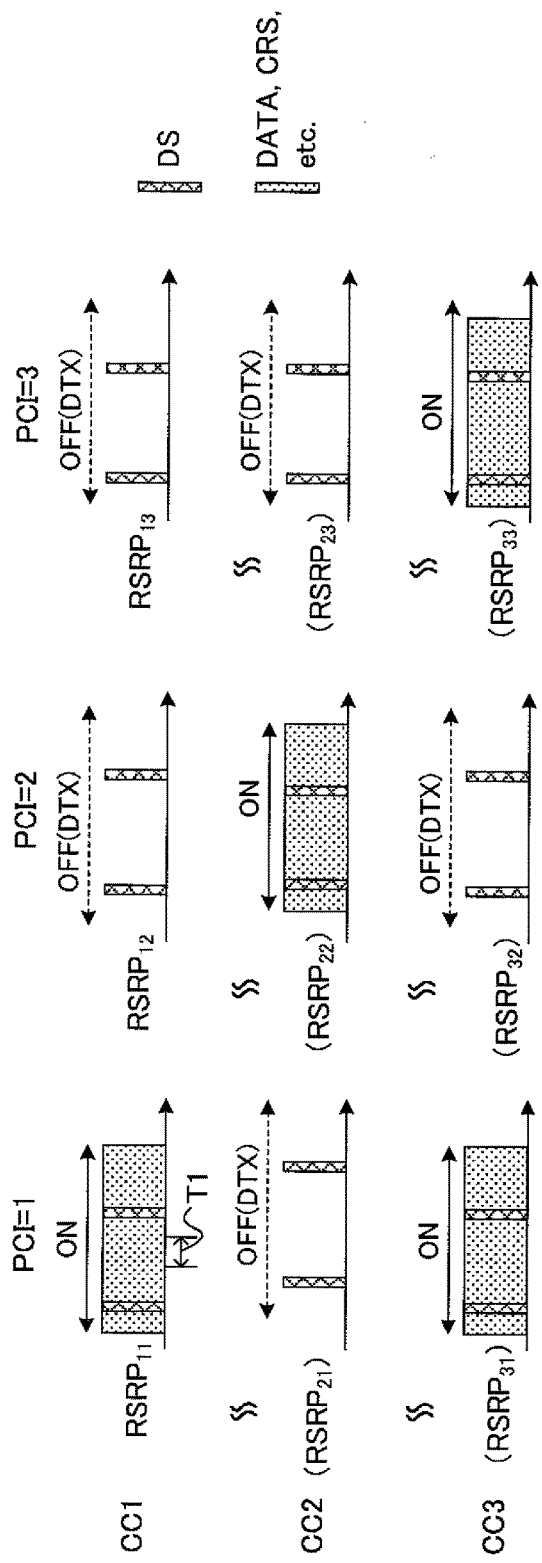
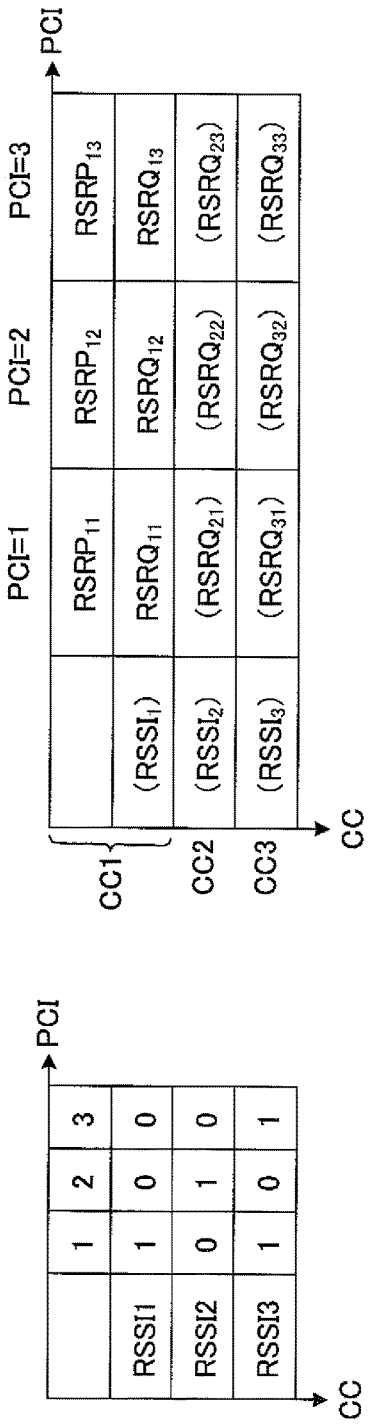
FIG.12A
FIG.12B
FIG.12C

| OPTION | REPORT TYPE | REPORT SIZE |
|---|---|---|
| RELEASE 11 | RSRP AND RSRQ | RSRP:12 AND RSRQ:12 |
| SECOND ASPECT | RSRP AND RSRQ | RSRP:4 AND RSRQ:4 |

| OPTION | REPORT TYPE | REPORT SIZE |
|---|---|---|
| RELEASE 11 | RSRP AND RSRQ | RSRP:12 AND RSRQ:12 |
| THIRD ASPECT | RSRP AND RSSI | RSRP:2 AND RSSI:1 |

RADIO BASE STATION, USER TERMINAL AND COMMUNICATION CONTROL METHOD

TECHNICAL FIELD

The present invention relates to a radio base station, a user terminal and a communication control method in a next-generation mobile communication system in which small cells are placed within a macro cell.

BACKGROUND ART

In LTE (Long Term Evolution) and successor systems of LTE (referred to as, for example, "LTE-advanced," "FRA (Future Radio Access)," "4G," etc.), a radio communication system (referred to as, for example, "HetNet" (Heterogeneous Network)) to place one or more small cells (including pico cells, femto cells and so on) having relatively small coverages of a radius of approximately several meters to several tens of meters, within a macro cell having a relatively large coverage of a radius of approximately several hundred meters to several kilometers, is under study (see, for example, non-patent literature 1).

Given this radio communication system, a scenario to use the same frequency F1 in both the macro cell and the small cells as shown in FIG. 1A ("co-channel"), and a scenario to use mutually different frequency bands (carriers) F1 and F2 between the macro cell and the small cells as shown in FIG. 1B ("separated frequencies," "non-co-channel," etc.) are under study. Also, in the scenario illustrated in FIG. 1B, a study is also in progress to use different frequencies F2 and F3 between the small cells.

CITATION LIST

Non-Patent Literature

Non-Patent Literature 1: 3GPP TR 36.814 "E-UTRA Further Advancements for E-UTRA Physical Layer Aspects"

SUMMARY OF INVENTION

Technical Problem

In radio communication systems such as those shown in FIGS. 1A and 1B, a user terminal measures the received quality (for example, RSRQ: Reference Signal Received Quality) of measurement signals for one or more neighbor small cells and reports this to the network side. On the network side, for example, whether or not to execute a handover is decided based on the received quality reported from the user terminal.

Now, for radio communication systems such as those shown in FIGS. 1A and 1B, a study is in progress to use a plurality of component carriers (CCs) in a small cell. In this case, a user terminal is expected to report the received quality of measurement signals to the network side on a per CC basis. However, when the received quality of measurement signals is reported to the network side on a per CC basis, the load of measurements, the amount of information to report and so on increase in the user terminal.

The present invention has been made in view of the above, and it is therefore an object of the present invention to provide a radio base station, a user terminal and a communication control method which can reduce the load of measurements, the amount of information to report and so on in user terminal, in a radio communication system in which a plurality of CCs are used in each small cell within a macro cell.

Solution to Problem

The radio base station according to the present invention provides a radio base station that forms a macro cell in a radio communication system in which a plurality of component carriers (CCs) are used in a small cell within the macro cell, and this radio base station has a transmission section that transmits, to a user terminal, measurement indication information that includes a measurement indication for received power of a measurement signal of a specific CC in the small cell, a receiving section that receives, from the user terminal, a measurement report that includes the received power of the measurement signal of the specific CC, a calculation section that calculates received quality of measurement signals of the plurality of CCs based on the received power of the measurement signal of the specific CC.

Advantageous Effects of Invention

According to the present invention, in a radio communication system in which a plurality of CCs are used in each small cell within a macro cell, it is possible to prevent the load of measurements, the amount of information to report and so on in user terminals.

BRIEF DESCRIPTION OF DRAWINGS

FIG. 12 provides diagrams to explain the communication control method according to the second aspect;

DESCRIPTION OF EMBODIMENTS

Figure 1A:
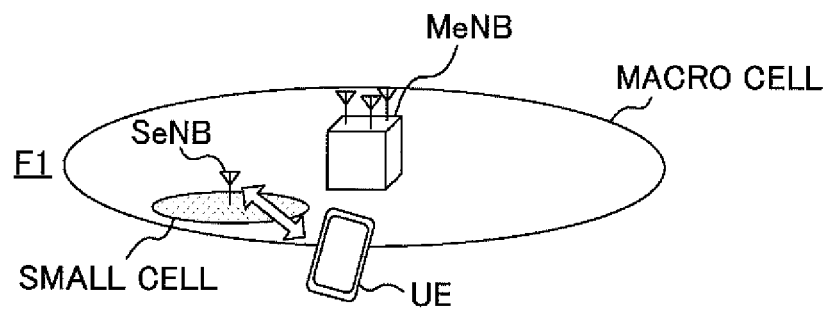
FIG. 1 provides diagrams to explain a radio communication system in which small cells are arranged within a macro cell.
Figure 1B:
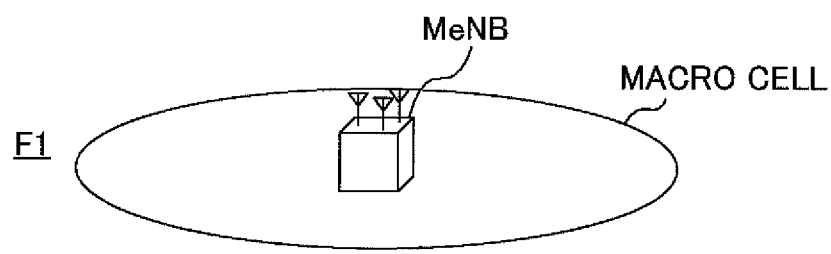
Figure 1B:
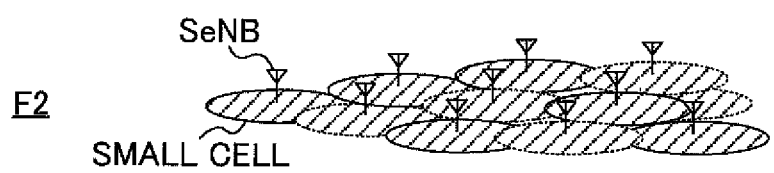
Figure 1B:
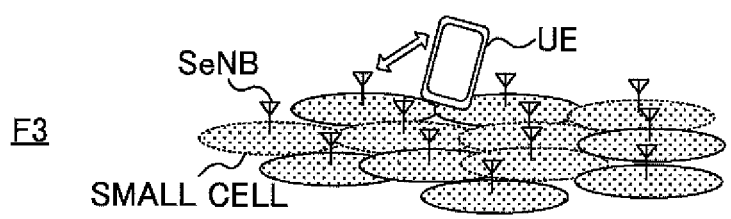
Figure 2:
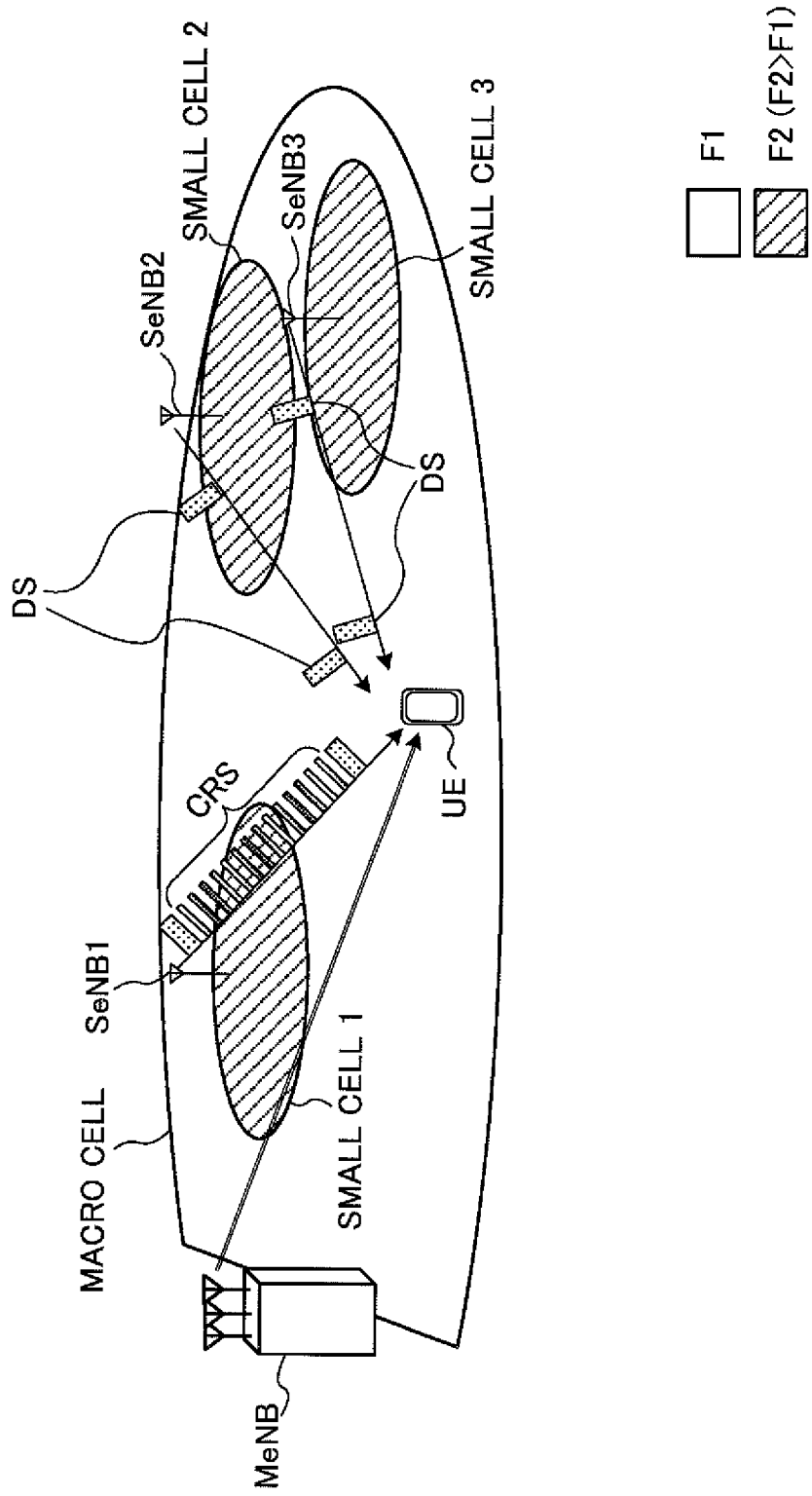
FIG. 2 is a diagram to explain a radio communication system in which the on/off state is switched.

FIG. 2 is a diagram to explain an example of a radio communication system in which small cells are arranged within a macro cell. As shown in FIG. 2, the radio communication system is comprised of a radio base station that forms a macro cell (hereinafter referred to as the "macro base station (MeNB: Macro eNodeB)"), radio base stations 1 to 3 that form small cells (hereinafter referred to as the "small base stations (SeNBs: Small eNodeBs)") 1 to 3, and a user terminal (UE: User Equipment).

In the radio communication system shown in FIG. 2, a relatively low frequency band F1 such as, for example, 2 GHz or 800 MHz is used in the macro cell, and a relatively high frequency band F2 such as, for example, 3.5 GHz or 10 GHz is used in the small cells 1 to 3.

As shown in FIG. 2, when the high frequency band F2 is used in the small cells 1 to 3, the assumption is that the small cells 1 to 3 are placed in a concentrated manner. Consequently, in the radio communication system shown in FIG. 2, a study is in progress to reduce the interference between the small cells, their power consumption and so on by switching the on/off state of the small cells 1 to 3 based on the traffic of the small cells 1 to 3.

Here, the on state refers to the state in which data is transmitted and received, and is also referred to as the "continuous transmission state." For example, in FIG. 2, the small cell 1 (small base station 1) having relatively heavy traffic is in the on state. In the on state, cell-specific reference signals (CRSs: Cell-specific Reference Signals) are transmitted in each subframe, and synchronization signals (PSS (Primary Synchronization Signal) and SSS (Secondary Synchronization Signal)), which are not shown, are transmitted every five subframes.

On the other hand, the off state refers to the state in which data is not transmitted or received, and is also referred to as the "discontinuous transmission (DTX) state." In FIG. 2, the small cells 2 and 3 (small base stations 2 and 3), where the traffic is relatively light, are in the off state. As shown in FIG. 2, in the off state, discovery signals, which will be described later, are transmitted in a longer cycle than CRSs. In the off state, the transmission of CRSs is omitted, so that it is possible to reduce the interference among the small cells 1 to 3 and the power consumption of the small base stations 2 and 3.

Figure 3:
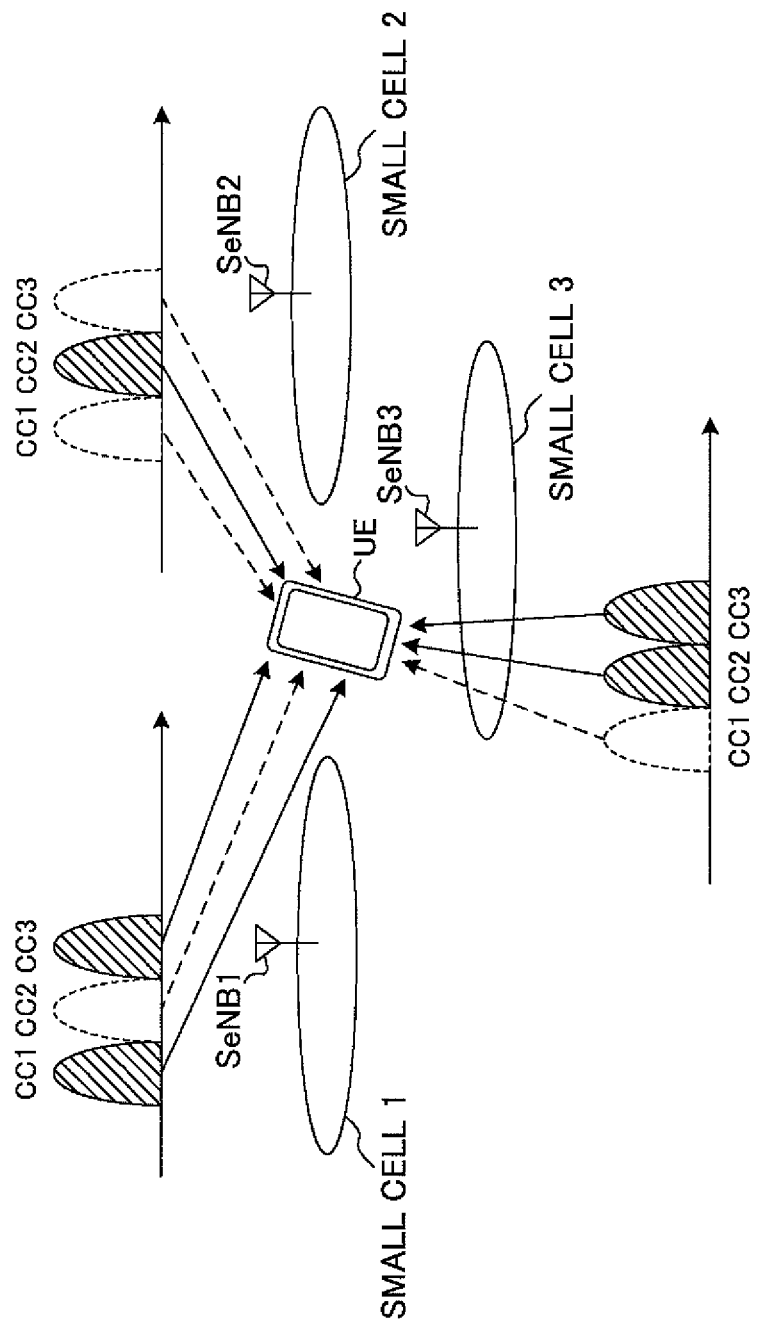
FIG. 3 is a diagram to explain the switching of the on/off state per CC.

Also, as shown in FIG. 3, with the radio communication system shown in FIG. 2, a study is also in progress to support a plurality of component carriers (CCs) in each small cell (small base station) and switch the on/off state on a per CC basis. For example, in FIG. 3, the small cells 1 to 3 each support CC 1 to CC 3. Note that FIG. 3 assumes that CC 1 and CC 3 in the small cell are in the on state, CC 2 in the small cell 2 is in the on state, and CC 2 and CC 3 in the small cell 3 are in the on state.

In FIG. 3, the user terminal is unsure which CCs in the small cells 1 to 3 are in the on state (or in the off state). Consequently, the user terminal needs to measure the received quality (for example, the RSRQ) of CC 1 to CC 3 in each of the small cells 1 to 3. Consequently, if the on/off state is switched per CC in the small cells, the load of measurements and the amount of information to report to the network side increase in the user terminal, compared to the case of switching the on/off state on a per small cell basis.

Also, the small cells 1 to 3 of FIG. 3 use different frequency bands from that of the macro cell. Consequently, a user terminal that is connected with the macro cell has to interrupt its communication with the macro cell in order to measure the received quality of CC 1 to CC 3 in each of the small cells 1 to 3 (inter-frequency measurements). As a result of this, when the received quality of CC 1 to CC 3 is measured with respect to each of the small cells 1 to 3, there is a threat that the time communication with the macro cell is interrupted increases, and the throughput decreases.

Figure 4:
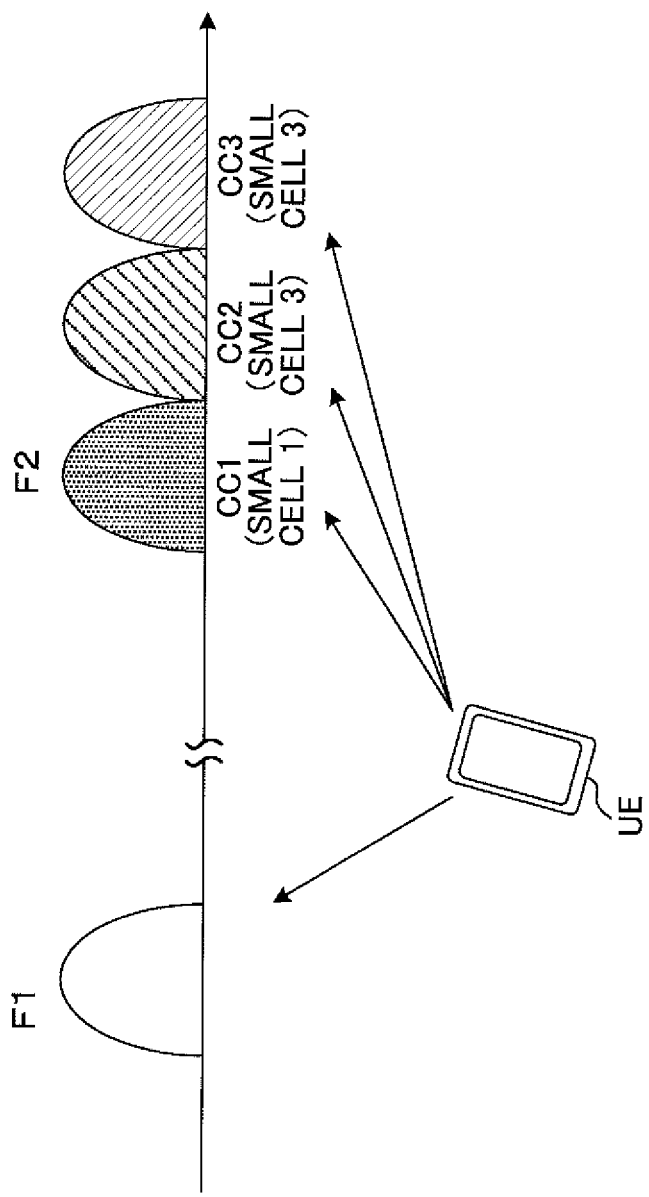
FIG. 4 is a diagram to explain carrier aggregation using CCs in the on state.

As described above, when the on/off state of the small cells 1 to 3 is switched on a per CC basis, a user terminal can execute carrier aggregation (CA) by gathering on-state CCs. In this CA, a plurality of CCs in a single small cell may be gathered, or a plurality of CC in different small cells may be gathered. For example, in FIG. 4, the CC of the macro cell, which uses the frequency band F1 (for example, 2 GHz), and CC 1 of the small cell 1 and CC 2 and CC 3 of the small cell 3, which use the frequency band F2 (for example, 3.5 GHz), are gathered.

Next, the received power and received quality measurements in a user terminal will be described with reference to FIGS. 5 to 7. Note that a user terminal will be described to measure the RSRP (Reference Signal Received Power) as the received power of the desired signal, measure the RSRQ as the received quality of the desired signal, and measure the RSSI (Received Signal Strength Indicator) as the total received power of the desired signal, interference signals and so on, but these are by no means limiting. For example, it is equally possible to measure the SINR (Signal to Interference Noise Ratio) and/or the like, as received quality.

Figure 5:
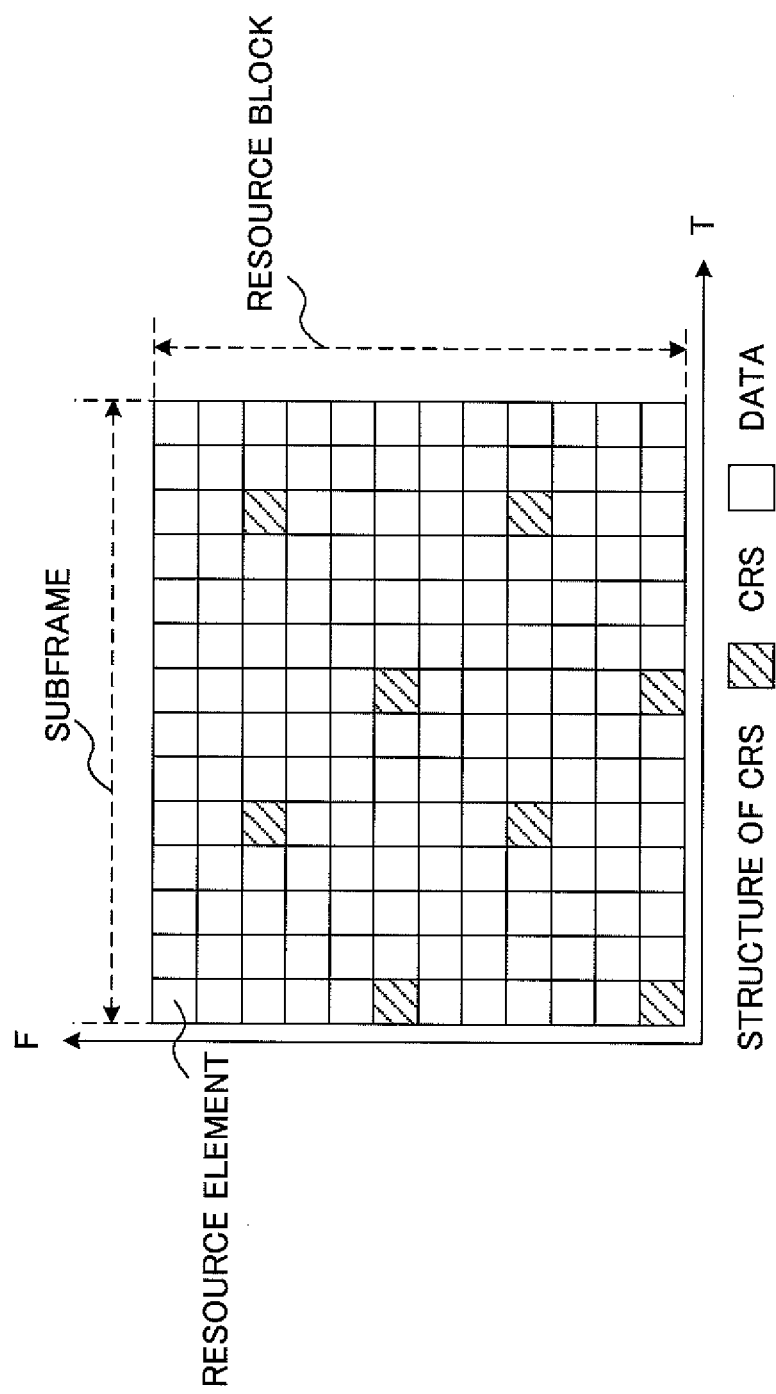
FIG. 5 is a diagram to explain RSRP and RSRQ measurements using CRSs.

FIG. 5 is a diagram to explain RSRP and RSRQ measurements using CRSs. As shown in FIG. 5, CRSs are arranged in part of the OFDM symbols in each subframe. The user terminal measures the received power of every resource element where a CRS is arranged, as the RSRP.

Also, the user terminal measures the received power of each resource block shown in FIG. 5 (that is, every resource block where a CRS is arranged), as the RSSI. Referring to FIG. 5, if there is no traffic data, the RSSI is the total of the received power of the CRSs. On the other hand, if there is traffic data, the RSSI is the total of the received power of the CRSs, the received power of the traffic data, the interference power and so on. By this means, the RSSI mirrors the traffic load.

Also, the user terminal measures the RSRQ based on the RSRP and the RSSI. For example, the user terminal may calculate the RSRQ using equation 1. Note that, in equation 1, N is a parameter to represent the bandwidth, and may be, for example, the number of resource blocks. Note that i is the subscript for the CC, and j is the subscript for the small cell.

$$RSRQ_{ij} = (N * RSRP_{ij}) / RSSI_i \quad \text{(Equation 1)}$$

In release 11, the user terminal measures the RSRPs and RSRQs of maximum four small cells, with respect to maximum three CCs, and reports the results to the network side.

Figure 6:
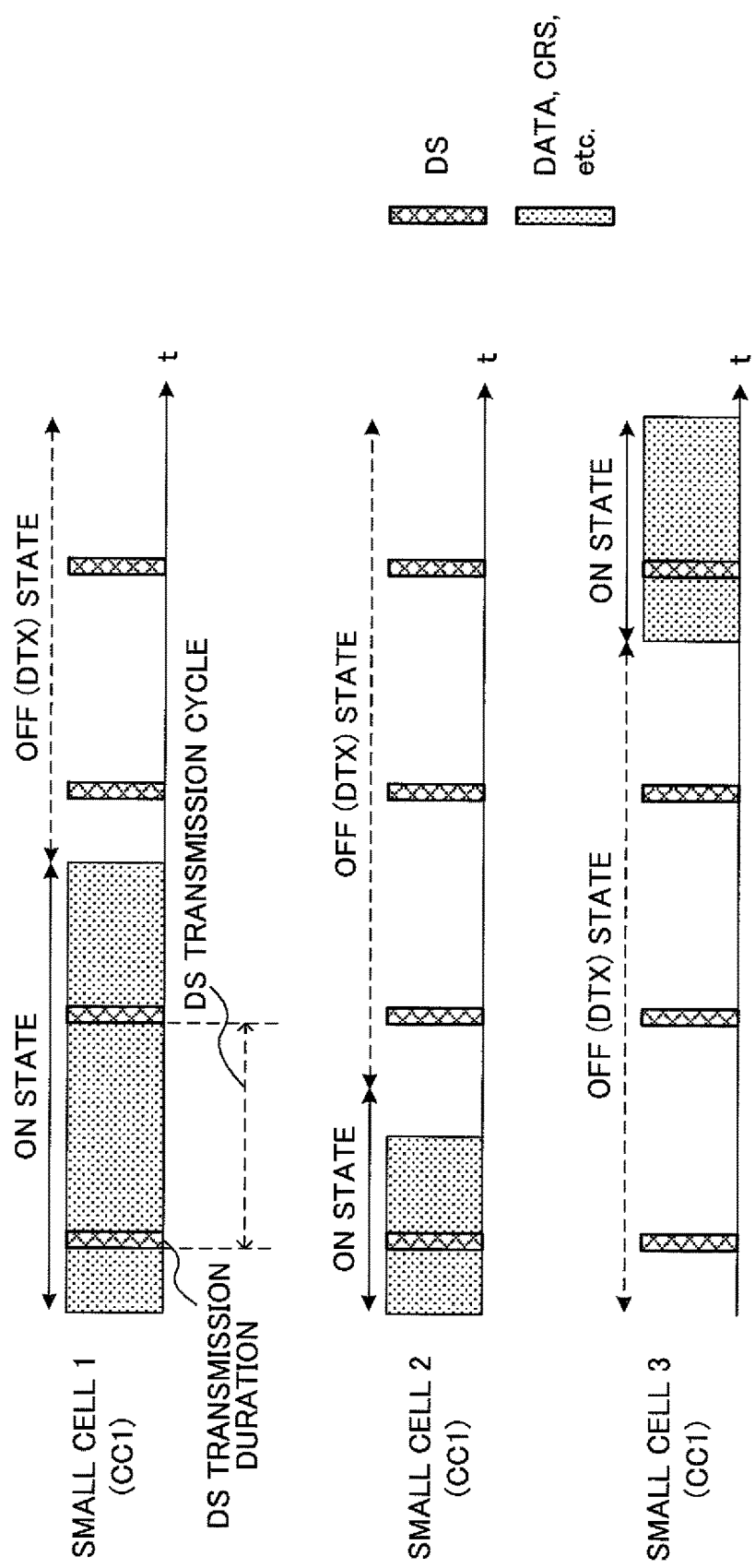
FIG. 6 is a diagram to explain RSRP and RSRQ measurements using DSs.

FIG. 6 is a diagram to explain RSRP and RSRQ measurements using discovery signals (DSs). In FIG. 6, the state of CC 1 in each of the small cells 1 to 3 is shown. As shown in FIG. 6, CRSs are transmitted during the on state, so that user a terminal can measure the RSRP and the RSRQ by using the CRSs, as mentioned earlier. On other hand, given that CRSs are not transmitted during the off state, a study is in progress to allow a user terminal to measure the RSRP by using discovery signals instead of CRSs.

Here, the discovery signals refer to signals for measuring received power in small cells. Note that the discovery signals may also be detection signals for use in small cell detection. The discovery signals may be defined based on reference signals such as the above-described CRS, the CSI-RS (Channel State Information-Reference Signal) and the PRS (Positioning Reference Signals), or based on synchronization signals such as the PSS (Primary Synchronization Signal) and the SSS (Secondary Synchronization Signal), or new signals may be defined.

Also, as shown in FIG. 6, the discovery signals are transmitted in DS transmission durations, which repeat in a DS transmission cycle. Note that the DS transmission cycle is a predetermined cycle such as, for example, 100 ms and 160 ms, and is a longer cycle than that of CRSs. Also, the DS transmission durations are durations in which the discovery signals are transmitted, and, for example, 1 ms. In the DS transmission durations, the discovery signal may be arranged in a higher density than CRSs.

Figure 7A:
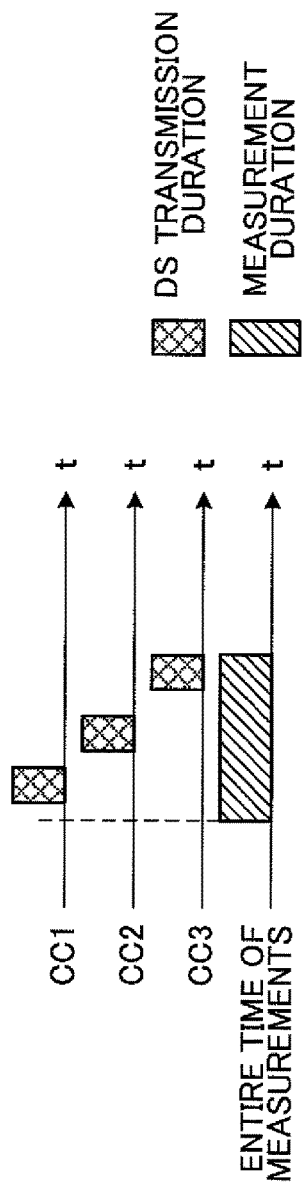
FIG. 7 provides diagrams to explain the time of RSRP measurements using DSs in each CC.

FIG. 7 is a diagram to explain the time of measurement using discovery signals per CC. Note that, in FIG. 7, the DS transmission duration in each CC in one small cell is shown. For example, in FIG. 7A, the discovery signals have varying DS transmission durations per CC. In the case illustrated in FIG. 7A, the entire time of measurements in the user terminal is at least a total of the DS transmission durations in CC 1 to CC 3.

Figure 7B:
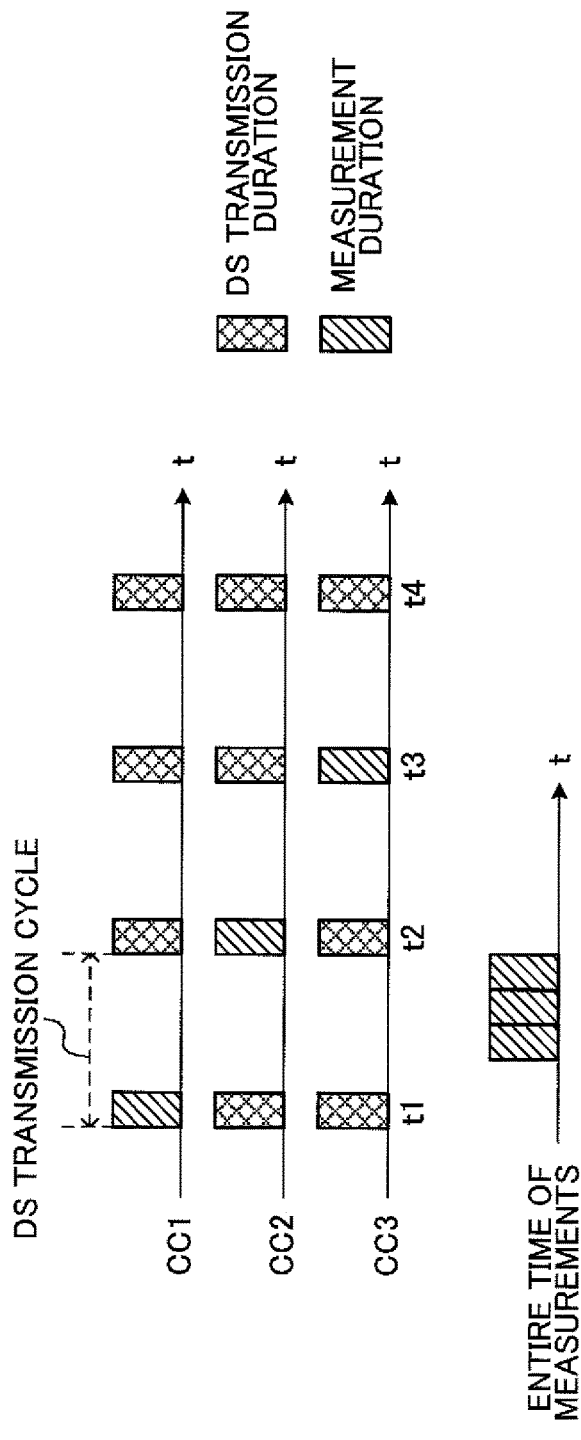

On the other hand, in FIG. 7B, each CC's DS transmission durations come in the same timings. In the case illustrated in FIG. 7B, the entire time of measurements in the user terminal depends on the number of receiving circuits (RF circuits) in the user terminal. For example, when the user terminal has a single receiving circuit, the user terminal can only receive one CC's discovery signal in a given DS transmission duration.

Consequently, if the user terminal has a single receiving circuit, as shown in FIG. 7B, the user terminal measures the RSRP of CC 1 in a DS transmission duration t1, measures the RSRP of CC 2 in a DS transmission duration t2, and measures the RSRP of the discovery signal of CC 3 in a DS transmission duration t3. In this case, the entire time of measurements in the user terminal is at least a total of the DS transmission durations t1 to t3.

As shown in FIGS. 7A and 7B, if the RSRPs of a plurality of CCs are measured in every small cell, the entire time of measurements in the user terminal increases in proportion to the number of CCs subject to measurements. Similarly, if the RSSIs of a plurality of CCs are measured in every small cell, the entire time of measurements in the user terminal increases in proportion to the number of CCs subject to measurements. Also, if the RSRPs and RSRQs of a plurality of CCs in each small cell are reported to the network side, the amount of information to report increases.

As described above, when a user terminal reports the RSRPs and RSRQs of a plurality of CCs to the network side for every small cell, the load of measurements and the amount of information to report in the user terminal are likely to be a problem.

So, the present inventors have focused on the fact that the RSRP does not vary much between a plurality of CCs in the same small cell, have come up with the idea of preventing the load of measurements and the amount of information to report in a user terminal from increasing, by measuring the RSRP of a specific CC and assuming that the RSRPs of the other CCs are the same, and thereupon arrived at the present invention.

With the communication control method according to the present invention, in a radio communication system in which a plurality of CCs are used in a small cell within a macro cell, the macro base station transmits, to a user terminal, measurement indication information including a measurement indication for the RSRP (the received power of the measurement signal) of a specific CC in the small cell. Also, the macro base station receives, from the user terminal, a measurement report including the RSRP of the specific CC. The macro base station the RSRQs (the received quality of the measurement signal) of a plurality of CCs based on this specific CC's RSRP.

According to the communication control method of the present invention, the macro base station assumes that the RSRP of a specific CC in a given small cell is the same as the RSRPs of the other CCs, so that the user terminal has only to measure and report the RSRP of a specific CC. Consequently, compared to case of measuring and reporting the RSRPs of all CCs, it is possible to reduce the load of measurements and the amount of information to report in the user terminal.

Now, the communication control method according to the present embodiment will be described in detail below. In the following description, discovery signals will be used as measurement signals. Furthermore, the RSRP will be used as the received power of the measurement signals, the RSSI will be used as total received power, and the RSRQ will be used as the received quality of the measurement signals, but these are by no means limiting.

(First Aspect)

Now, a communication control method according to a first aspect will be described with reference to FIGS. 8 to 10. With the communication control method according to the first aspect, a user terminal measures the RSRP of a specific CC and the RSSIs in a plurality of CCs based on measurement indication information from a macro base station, and transmits a measurement report to the macro base station. Based on the RSRP of a specific CC and the RSSIs in a plurality of CCs contained in the measurement report, the macro base station calculates the RSRQs in a plurality of CCs.

Figure 8:
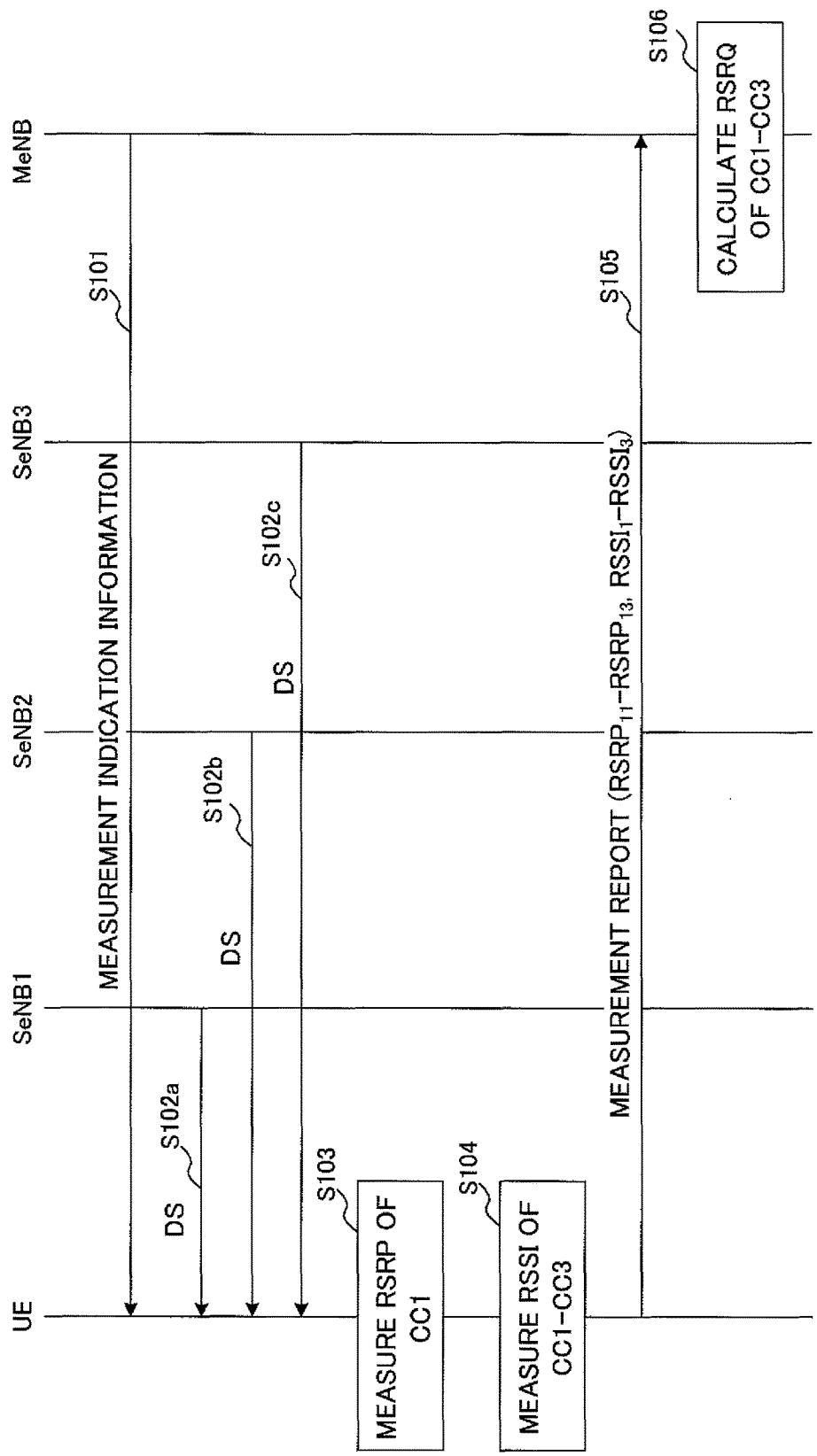
FIG. 8 is a sequence diagram to show a communication control method according to a first aspect.

FIG. 8 is a sequence diagram to show the communication control method according to the first aspect. Also, FIG. 9 provides diagrams to explain the communication control method according to the first aspect. Note that, in FIGS. 8 and 9, a radio communication system to place small cells 1 to 3 within a macro cell is assumed (FIG. 2). Also, assume that CC 1 to CC 3 are used in each of the small cells 1 to 3.

As shown in FIG. 8, the macro base station transmits measurement indication information, which commands measurements of the RSRP in CC 1 and the RSSIs in CC 1 to CC 3, to the user terminal (step S101). Note that the measurement indication information may be transmitted by using higher layer signaling such as RRC signaling, broadcast information and so on. Also, the measurement indication information may be transmitted from the small base stations.

Figure 9A:
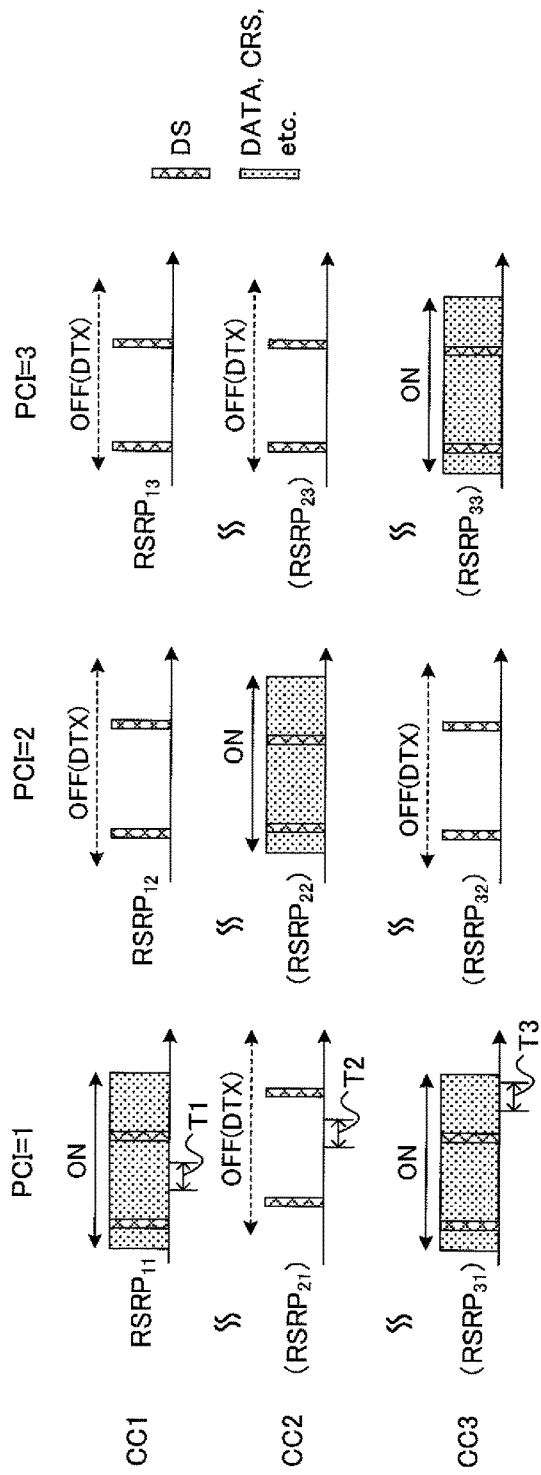
FIG. 9 provides diagrams to explain the communication control method according to the first aspect.

The small base stations 1 to 3 each transmit the discovery signals of CC 1 to CC 3 (step S102a to S102c). To be more specific, as shown in FIG. 9A, the small base station 1 (PCI (Physical Cell Identifier)=1) transmits discovery signals, in each of CC 1 to CC 3, in a DS transmission cycle. Similarly, the small base stations 2 and 3 (PCI=2 and 3) each transmit discovery signals in a DS transmission cycle.

Note that, although, in FIG. 9A, the small base stations transmit the discovery signals of CC 1 to CC 3 in the same timings (see FIG. 7B), the discovery signals of CC 1 to CC 3 may be transmitted in different timings as well (see FIG. 7A). Also, in FIG. 9A, the discovery signals of the small base stations 1 to 3 (PCI=1 to 3) of the same CC may be transmitted synchronously (see FIG. 6).

The user terminal measures the RSRP of a specific CC (here, CC 1) in each small cell based on the above measurement indication information (step S103). To be more specific, the user terminal measures the RSRPs (RSRP$_{11}$, RSRP$_{12}$ and RSRP$_{13}$) in the DS transmission durations of the small cells 1 to 3 of CC 1 in FIG. 9A.

The assumption here is that the RSRPs (RSRP$_{21}$, RSRP$_{22}$ and RSRP$_{23}$) of the small cells 1 to 3 of CC 2 do not differ much from the RSRPs (RSRP$_{11}$, RSRP$_{12}$ and RSRP$_{13}$) of the small cells 1 to 3 of CC 1. Consequently, the user terminal skips the measurements of RSRP$_{21}$, RSRP$_{22}$ and RSRP$_{23}$ of the small cells 1 to 3 in CC 2. Similarly, the user terminal skips the measurements of RSRP$_{31}$, RSRP$_{32}$ and RSRP$_{33}$ of the small cells 1 to 3 in CC 3.

Also, the user terminal measures each CC's RSSI based on the above measurement indication information. To be more specific, the user terminal measures the RSSIs (RSSI$_{1}$, RSSI$_{2}$ and RSSI$_{3}$) of CC 1 to CC 3 (step S104). Note that the RSSI is total received power that includes the desired received power, the interference power, noise and so on, so that the RSSI in each CC is common between small cells. Also, the RSSI may be measured before the RSRP.

Here, the RSSI measurement duration will be described. The RSSI measurement duration has only to be a predetermined unit of time, and may be, for example, a subframe, an OFDM symbol and so on. As described earlier, the RSRP is measured during DS transmission durations by using discovery signals. Meanwhile, in DS transmission durations, it is likely that only discovery signals are transmitted, and other signals (for example, data signals, CRSs, PSS/SSS, etc.) are not transmitted. Consequently, the RSSI in DS transmission durations does not mirror the load of the small cells in the on state.

So, as shown in FIG. 9A, the user terminal measures RSSI$_{1}$ to RSSI$_{3}$ of CC 1 to CC 3 in measurement durations T1 to T3 in which no discovery signal is transmitted. In measurement durations T1 to T3, data signals, CRSs and so on are transmitted during the on state, and no transmission takes place during the off state. Consequently, load to match the small cells' on/off state is mirrored. For example, RSSI measurement durations T1 to T3 are specified by using one of following methods (1) to (3).

In method (1), the user terminal specifies discovery signal transmission durations based on discovery signal configuration information (hereinafter "DS configuration information"), and configures predetermined durations apart from the transmission durations as measurement durations T1 to T3. Here, the DS configuration information is reported from the macro base station to the user terminal, and may include at least one of the DS transmission durations, the DS transmission cycle, the DS transmission duration starting offset and the sequence pattern. In method (1), DS configuration information is reported, so that measurement durations T1 to T3 can be reported to the user terminal implicitly.

In method (2), the user terminal specifies measurement durations T1 to T3 based on measurement duration information that is reported explicitly. The measurement duration information is information to indicate measurement durations, and may be, for example, relative locations such as offsets for the discovery signal transmission durations, absolute locations such as subframe numbers and OFDM symbol numbers. Also, the measurement duration information may be reported from the macro base station to user terminals in the connected state (for example, RRC_CONNECTED).

In method (3), the user terminal specifies measurement durations T1 to T3 based on pre-rules. The pre-rules refer to rules that are memorized in the user terminal in advance, such as, for example, making the subframe that follows a discovery signal-transmitting subframe a measurement duration.

The user terminal transmits a measurement report, which includes the RSRP of a specific CC in each small cell, measured in step S103, and the RSSI of each CC, measured in step S104, to the macro base station (step S105). To be more specific, the user terminal transmits a measurement report that contains RSRP$_{11}$, RSRP$_{12}$ and RSRP$_{13}$ of the small cells 1, 2 and 3 in CC 1 and RSSI$_{1}$, RSSI$_{2}$ and RSSI$_{3}$ in CCs 1, 2 and 3.

Figure 9B:
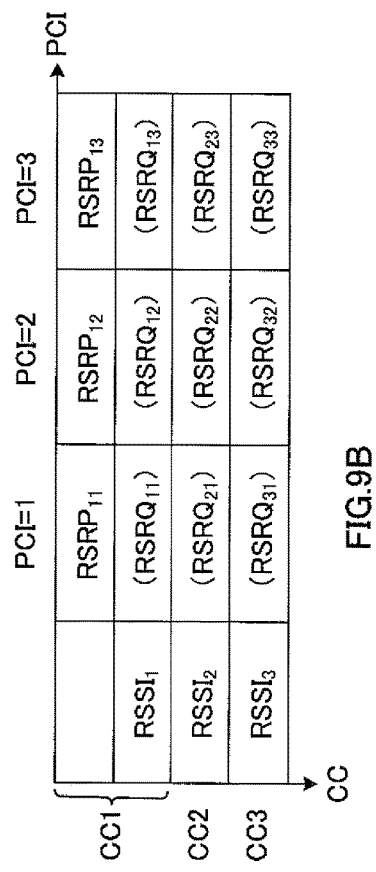

Based on the measurement report from the user terminal, the macro base station calculates the RSRQs in a plurality of CCs in each small cell (step S106). To be more specific, as shown in FIG. 9B, the macro base station calculates RSRQ$_{11}$, RSRQ$_{12}$ and RSRQ$_{13}$ of the small cells 1, 2 and 3 in CC 1 by using RSRP$_{11}$, RSRP$_{12}$, RSRP$_{13}$ and RSSI$_{1}$. For example, RSRQ$_{11}$, RSRQ$_{12}$ and RSRQ$_{13}$ may be calculated using above equation 1.

Here, RSRP$_{21}$, RSRP$_{22}$, and RSRP$_{23}$ of the small cells 1, 2 and 3 in CC 2 are estimated substantially equal to RSRP$_{11}$, RSRP$_{12}$ and RSRP$_{13}$ of the small cells 1, 2 and 3 in CC 1, respectively, so that the measurements in the user terminal and reporting to the macro base station are skipped. Consequently, the macro base station calculates RSRQ$_{21}$, RSRQ$_{22}$ and RSRQ$_{23}$ of CC 2 by using RSRP$_{11}$, RSRP$_{12}$ and RSRP$_{13}$ of CC 1 and RSSI$_{2}$ of CC 2. Similarly, the macro base station calculates RSRQ$_{31}$, RSRQ$_{32}$ and RSRQ$_{33}$ of CC 3 by using RSRP$_{11}$, RSRP$_{12}$ and RSRP$_{13}$ of CC 1 and RSSI$_{3}$ of CC 3. Note that RSRQ$_{21}$ to RSRQ$_{33}$ may be calculated by using above equation 1.

As described above, with the communication control method according to the first aspect, when a plurality of CCs are used in each small cell, a user terminal has only to measure and report the RSRP of each small cell in a specific CC, and, by this means, the macro base station can calculate the RSRQ of every small cell in all CCs. Consequently, compared to the case of measuring and reporting the RSRP of every small cell in all CCs, it is possible to reduce the load of measurements and the amount of information to report in the user terminal.

Figures 10A, 10B:
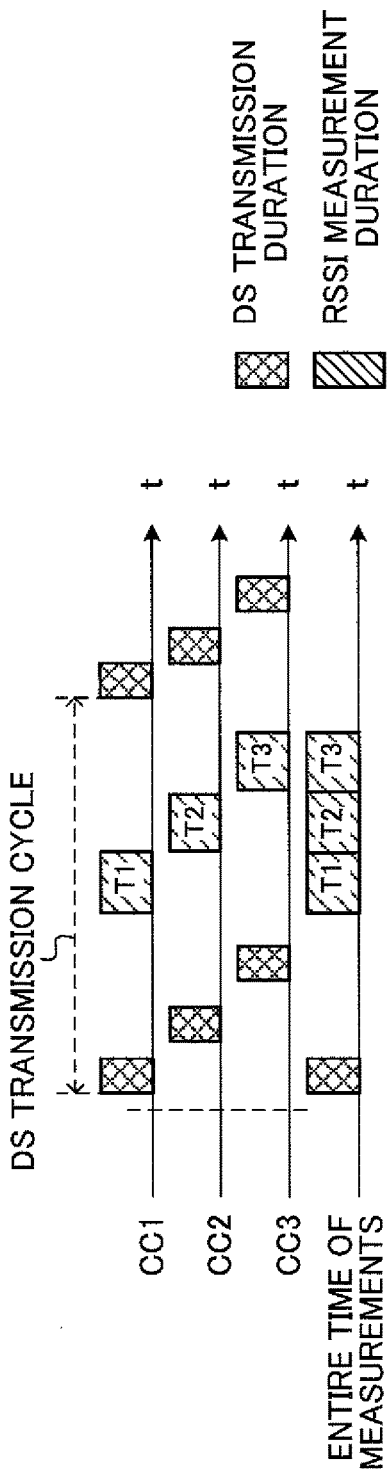
FIG. 10 provides diagrams to explain advantages of the communication control method according to the first aspect.

FIG. 10 provides diagrams to explain advantages of the communication control method according to the first aspect. As shown in FIG. 10A, with the communication control method according to the first aspect, the user terminal measures RSRP$_{11}$, RSRP$_{12}$ and RSRP$_{13}$ of the small cells 1 to 3 in the DS transmission durations of CC 1, and measures RSSI$_{1}$ to RSSI$_{3}$ of CC 1 to CC 3 in measurement durations T1 to T3 in which no discovery signal is transmitted. With the communication control method according to the first aspect, it is possible to skip measurements in the DS transmission durations of CC 2 and CC 3, thereby reducing the load of measurements.

Note that, if the RSSI is measured, in addition to the RSRP, in the DS transmission durations of CC 1 to CC 3 in FIG. 10A, RSSI measurement durations T1 to T3 need not be provided. In this case, the user terminal measures $RSRP_{11}$ to $RSRP_{13}$ by using discovery signals in part (for example, OFDM symbols) of the DS transmission durations (for example, subframes) of CC 1, and measures $RSSI_1$ in the rest of the time (for example, OFDM symbols) where CRSs, data signals and others are contained. Also, the user terminal measures $RSSI_2$ and $RSSI_3$ in times (for example, OFDM symbols) within the DS transmission durations of CC 2 and CC 3 where CRSs, data signals and others are contained.

Also, as shown in FIG. 10B, in the measurement report of release 11, the RSRPs and RSRQs of maximum four cells (small cells) of maximum three CCs are reported. Consequently, the amount of information to report from the user terminal becomes an amount of information to sum maximum 12 (=3×4) RSRPs and maximum 12 (=3×4) RSRQs.

Meanwhile, with the communication control method according to the first aspect, only the RSRPs of maximum four cells of one CC and the RSSIs of maximum three CCs have to be reported. Consequently, the amount of information to report from the user terminal becomes an amount of information to sum maximum four RSRPs and maximum three RSSIs. Here the RSSIs carry a smaller amount of information than the RSRQs. Consequently, with the communication control method according to the first aspect, it is possible to make the amount of information to report smaller than in release 11.

(Second Aspect)

A communication control method according to a second aspect will be described with reference to FIGS. 11 to 13. With the communication control method according to the second aspect, the user terminal reports a measurement report that includes the RSRP of a specific CC and the RSRQ of this specific CC, to the macro base station, based on measurement indication information from the macro base station. The macro base station calculates the RSRQs of a plurality of CCs based on the RSRP of a specific CC and the RSRQ of this specific CC included in the measurement report.

Figure 11:
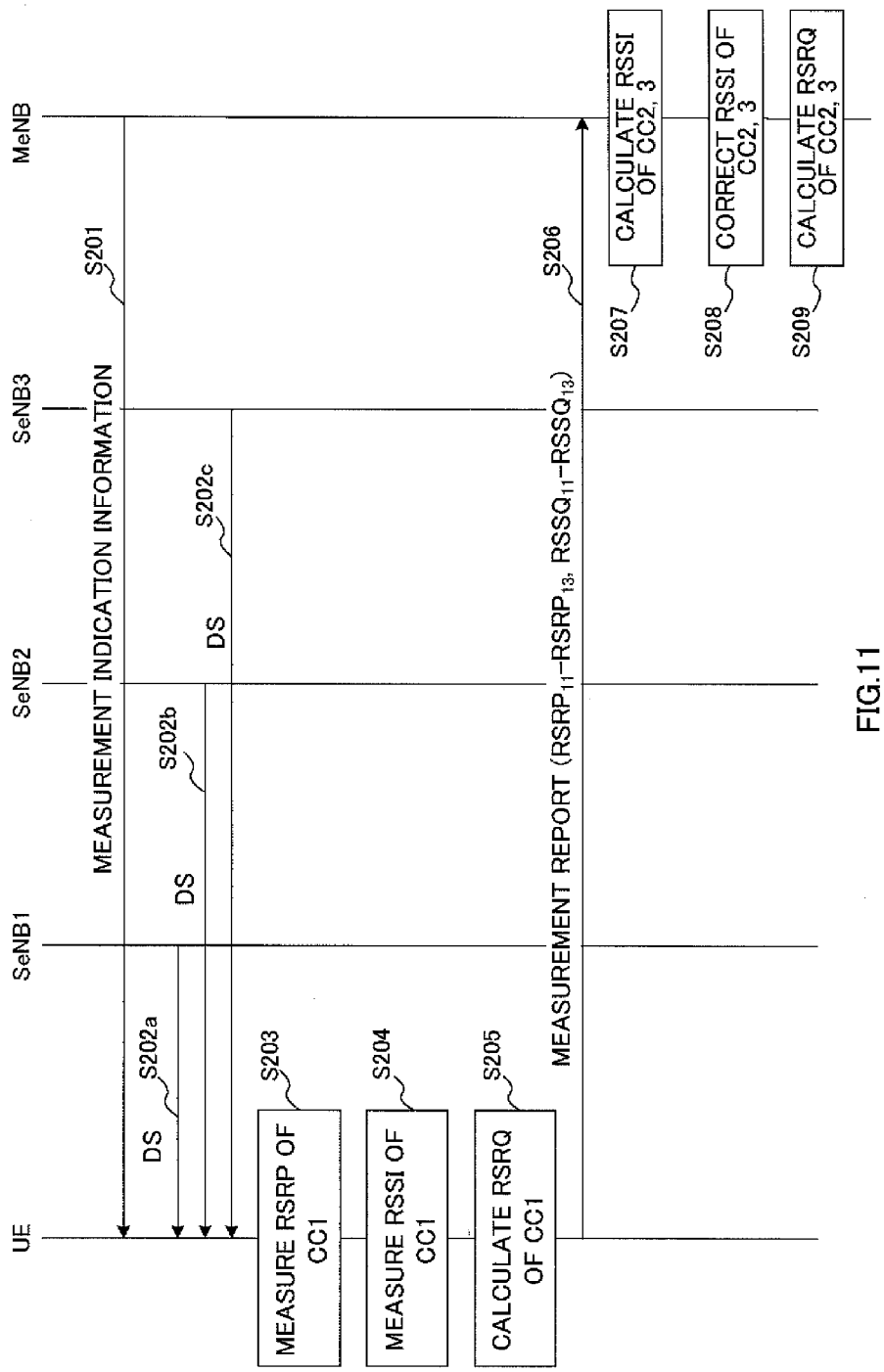
FIG. 11 is a sequence diagram to show a communication control method according to a second aspect.

FIG. 11 is a sequence diagram of the communication control method according to the second aspect. FIG. 12 provides diagrams to explain the communication control method according to the second aspect. Note that the communication control method according to the second aspect will be described below primarily with reference to its differences from the communication control method of the first aspect.

As shown in FIG. 1, the macro base station transmits measurement indication information, which commands measurements of the RSRP in CC 1 and the RSRQ in CC 1, to the user terminal (step S201). With the communication control method according to the second aspect, the measurement indication information is different from that of the first aspect in that a measurement indication for the RSRQ of CC 1 is included instead of a measurement indication for the RSSIs in CC 1 to CC 3.

The small base stations 1 to 3 transmit the discovery signal of CC 1 (step S202a to S202c). With the communication control method according to the second aspect, the small base stations 1 to 3 can skip transmitting the discovery signals of CCs that are not specified in the measurement indication information (here, CC 2 and CC 3). Note that the details of steps S202 and S203 of FIG. 11 are the same as those of steps S102 and S103 of FIG. 8, and therefore description will be omitted.

To find the RSRQ in CC 1, the user terminal measures $RSSI_1$ in CC 1 (step S204). To be more specific, as shown in FIG. 12A, the user terminal measures $RSSI_1$ of CC 1 in measurement duration T1, in which no discovery signal is transmitted. Note that, in the communication control method according to the second aspect, unlike the first aspect, $RSSI_2$ and $RSSI_3$ of CC 2 and CC 3 are not measured.

The user terminal calculates $RSRQ_{11}$, $RSRQ_{12}$ and $RSRQ_{13}$ of small cells 1, 2 and 3 in CC 1 by using $RSRP_{11}$, $RSRP_{12}$ and $RSRP_{13}$ measured in step S203 and $RSSI_1$ calculated in step S204 (step S205). For example, the user terminal may calculate $RSRQ_{11}$, $RSRQ_{12}$ and $RSRQ_{13}$ by using above equation 1.

The user terminal transmits a measurement report, which includes $RSRP_{11}$, $RSRP_{12}$ and $RSRP_{13}$ measured in step S203 and $RSRQ_{11}$, $RSRQ_{12}$ and $RSRQ_{13}$ calculated in step S205, to the macro base station (step S206).

Based on $RSRP_{11}$, $RSRP_{12}$ and $RSRP_{13}$ of CC 1 and the on/off states of the small cells of CC 2 and CC 3 included in the measurement report, the macro base station calculates $RSSI_2$ and $RSSI_3$ of CC 2 and CC 3 (step S207). To be more specific, the macro base station may calculate $RSSI_2$ and $RSSI_3$ by using equation 2:

$$RSSI_i = \Sigma_j RSRP_{ij} * (N_{PDSCH\_RE} * load_{ij} + N_{CRS\_RE}) \quad \text{(Equation 2)}$$

Note that, in equation 2, i is the subscript for the CC, and j is the subscript for the small cell. Also, load; is a parameter that is based on the on/off state of the small cell j in CCi. For example, for $load_{ij}$, "1" may be configured when the small cell j in CCi is in the on state, and "0" may be configured when the small cell j in CCi is in the off state. For example, in the case illustrated in FIG. 12A, $load_{ij}$ is configured as shown in FIG. 12B.

Also, in equation 2, $N_{CRS\_RE}$ is the number of CRS resource elements arranged in one OFDM symbol in one resource block. For example, as shown in FIG. 5, $N_{CRS\_RE}$ is "2" in the event of 1-antenna transmission. On the other hand, in the event of 2-antenna transmission (not shown), $N_{CRS\_RE}$ is "4."

Also, in equation 2, $N_{PDSCH\_RE}$ is the number of PDSCH resource elements arranged in one OFDM symbol in one resource block. For example, as shown in FIG. 5, $N_{PDSCH\_RE}$ is "10" in the event of 1-antenna transmission. On the other hand, in the event of 2-antenna transmission (not shown), $N_{PDSCH\_RE}$ is "8."

For example, as shown in FIG. 12A, when the small cells 1 and 3 of CC 2 are in the off state and the small cell 2 is in the on state, $RSSI_2$ is calculated as follows by using above equation 2. Here, $RSRP_{21}$, $RSRP_{22}$ and $RSRP_{23}$, which are not included in the measurement report, are estimated substantially equal to $RSRP_{11}$, $RSRP_{12}$ and $RSRP_{13}$, respectively.

$$RSSI_2 = RSRP_{21} * (N_{PDSCH\_RE} * 0 + N_{CRS\_RE}) + RSRP_{22} * (N_{PDSCH\_RE} * 1 + N_{CRS\_RE}) + RSRP_{23} * (N_{PDSCH\_RE} * 0 + N_{CRS\_RE})$$

Also, as shown in FIG. 12A, the small cells 1 and 3 of CC 3 are in the on state and the small cell 2 is in the off state, $RSSI_3$ is calculated as follows by using above equation 2. Here, $RSRP_{31}$, $RSRP_{32}$ and $RSRP_{33}$, which are not included in the measurement report, are estimated to be substantially equal to $RSRP_{11}$, $RSRP_{12}$, $RSRP_{13}$, respectively.

$$RSSI_3 = RSRP_{31} * (N_{PDSCH\_RE} * 1 + N_{CRS\_RE}) + RSRP_{32} * (N_{PDSCH\_RE} * 0 + N_{CRS\_RE}) + RSRP_{23} * (N_{PDSCH\_RE} * 1 + N_{CRS\_RE})$$

Also, the macro base station may correct $RSSI_2$ and $RSSI_3$ of CC 2 and CC 3 (step S208). To be more specific, the macro base station calculates $RSSI_1$ by using above equation 2, and also calculates $RSSI_1$ based on $RSRP_{11}$ to $RSRP_{13}$ and $RSRQ_{11}$ to $RSRQ_{13}$ included in the measurement report. The macro base station corrects $RSSI_2$ and $RSSI_3$ of CC 2 and CC 3 based on the comparison result of the two. For example, the macro base station may add the difference (true value) between the two to $RSSI_1$ and $RSSI_2$. By this means, it is possible to mirror the impact of noise and so on on $RSSI_2$ and $RSSI_3$.

The macro base station calculates $RSRQ_{21}$ to $RSRQ_{23}$ and $RSRQ_{31}$ to $RSRQ_{33}$ based on $RSRP_{11}$, $RSRP_{12}$ and $RSRP_{13}$ that are reported from the user terminal and $RSSI_2$ and $RSSI_3$ that are calculated (step S209).

As described above, with the communication control method according to the second aspect, when a plurality of CCs are used in each small cell, the user terminal has only to measure and report the RSRP and RSRQ of each small cell in a specific CC, and, by this means, the macro base station can calculate the RSRQ of every small cell in all CCs. Consequently, compared to the case of measuring and reporting the RSRP and RSRQ of every small cell in all CCs, it is possible to reduce the load of measurements and the amount of information to report in the user terminal.

Figures 13A, 13B:
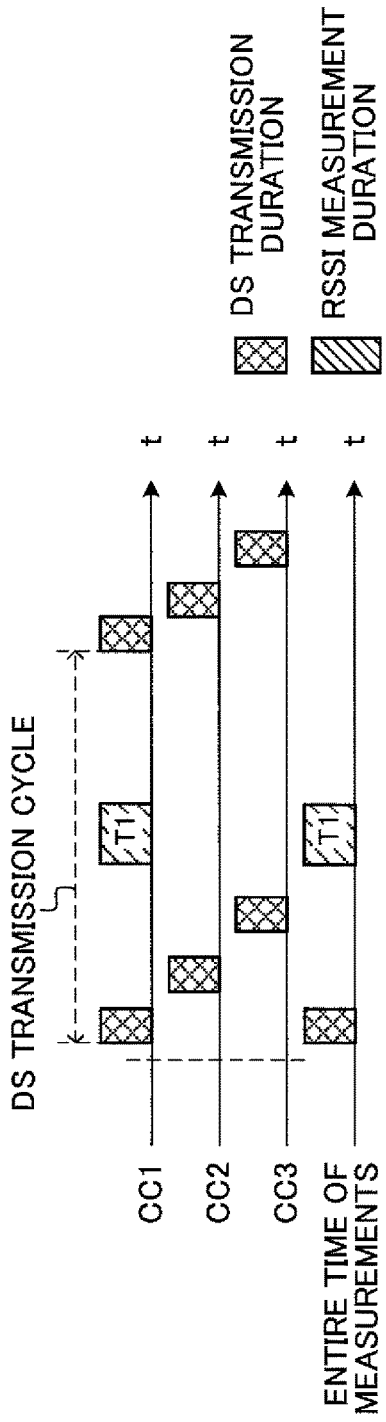
FIG. 13 provides diagrams to explain advantages of the communication control method according to the second aspect.

FIG. 13 provides diagrams to explain advantages of the communication control method according to the second aspect. As shown in FIG. 13A, with the communication control method according to the second aspect, the user terminal measures $RSRP_{11}$, $RSRP_{12}$ and $RSRP_{13}$ of the small cells 1 to 3 in the DS transmission durations of CC 1, and measures $RSSI_1$ of CC 1 in measurement duration T1, in which no discovery signal is transmitted. With the communication control method according to the second aspect, measurements in the DS transmission durations of CC 2 and CC 3 and the measurements of $RSSI_2$ and $RSSI_3$ in DS measurement durations T2 and T3 can be skipped, so that it is possible to reduce the load of measurements. Also, with the communication control method according to the second aspect, it is possible to skip transmitting the DSs of CC 2 and CC 3. Note that, as shown in FIG. 10A, when $RSSI_1$ is measured in the DS transmission durations of CC 1 in FIG. 13A, in addition to $RSRP_{11}$ to $RSRP_{13}$, RSSI measurement duration T1 needs not be provided.

Also, as shown in FIG. 13B, with the communication control method according to the second aspect, the user terminal has only to report the RSRPs of maximum four cells of one CC and the RSRQs of maximum four cells of one CC. Consequently, with the communication control method according to the second aspect, it is possible to make the amount of information to report smaller than in release 11. Also, with the communication control method according to the second aspect, the type of information that is reported is the same as in release 11 (that is, the RSRP and the RSRQ), so that it is not necessary to update the type of reporting.

(Third Aspect)

A communication control method according to a third aspect will be described with reference to FIGS. 14 to 17. With the communication control method according to the third aspect, a plurality of user terminals within a predetermined area are grouped. Based on measurement indication information from the macro base station, each user terminal in the group measures the RSRP of a specific CC in a specific small cell, which are designated to be different from those of the other user terminals, and the RSSI of this specific CC, and transmits a measurement report to the macro base station. The macro base station calculates the RSRQs of all CCs based on the measurement reports from each user terminal in the group.

Figure 14:
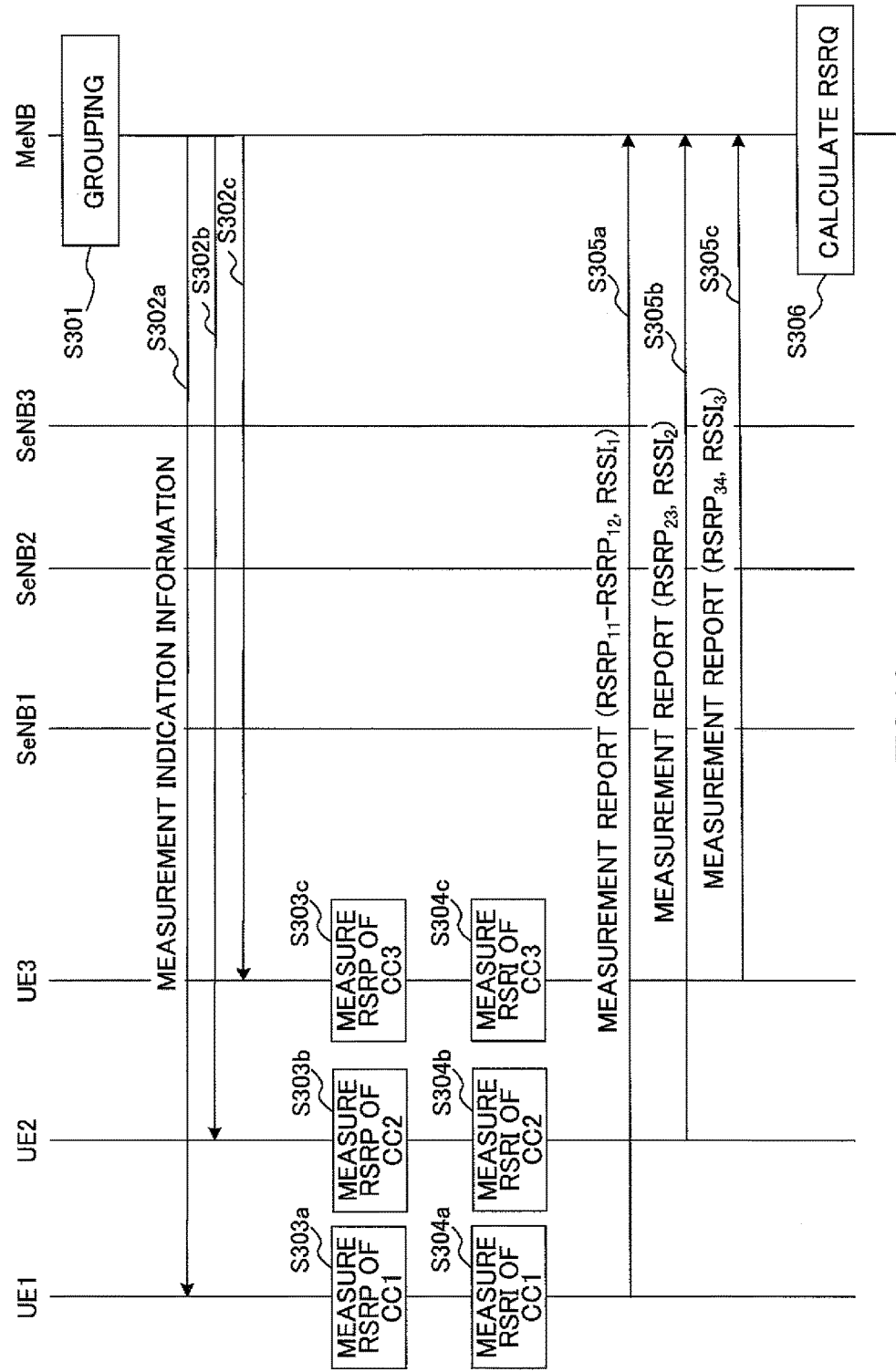
FIG. 14 is a sequence diagram to show a communication control method according to a third aspect.
Figure 15A:
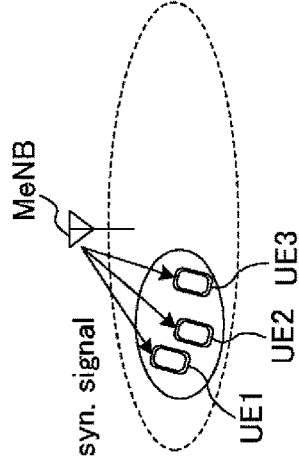
FIG. 15 provides diagrams to explain grouping in the communication control method according to the third aspect.

FIG. 14 is a sequence diagram to show the communication control method according to the third aspect. Also, FIG. 15 and FIG. 16 are diagrams to explain the communication control method according to the third aspect. Note that the communication control method according to the third aspect will be described below primarily with reference to its differences from the communication control method of the first aspect.

As shown in FIG. 14, the macro base station groups a plurality of user terminals located within a predetermined area (step S301). To be more specific, as shown in FIG. 15A, it is equally possible to group a plurality of user terminals by using GNSS (Global Navigation Satellite System), GPS (Global Positioning System) and so on. In this case, a plurality of user terminals each transmit location information from GNSS and GPS to the macro base station. The macro base station groups a plurality of user terminals that are shown in the location information to be located within a predetermined area.

Figure 15B:
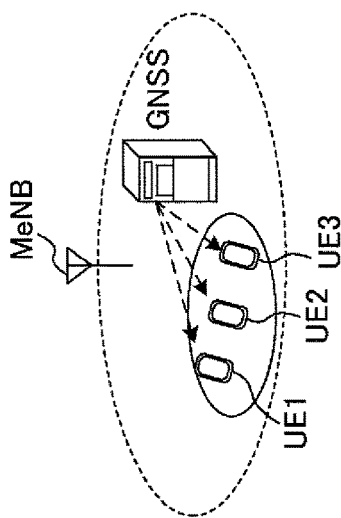
Figure 16:
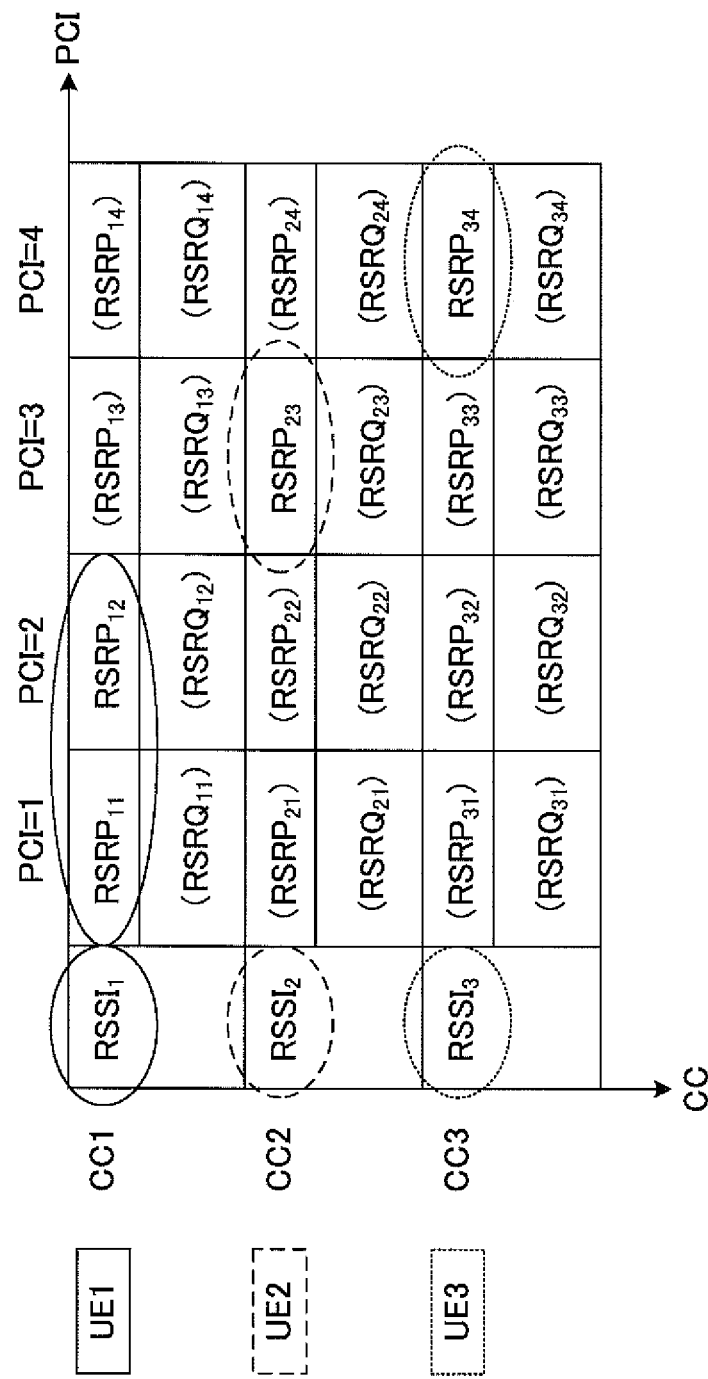
FIG. 16 is a diagram to explain the communication control method according to the third aspect.

Alternatively, as shown in FIG. 15B, it is equally possible to group a plurality of user terminals by using the received quality of measurement signals (for example, CRS, CSI-RS, PSS, SSS, etc.) from the macro base station (or a small base station that is not shown). In this case, each user terminal measures the received quality of the measurement signals from the macro base station, and reports the measurement results to the macro base station. A plurality of user terminals having received quality within a predetermined range are estimated to be located within a predetermined area. Consequently, the macro base station groups a plurality of user terminals having received quality within a predetermined range.

Figure 15C:
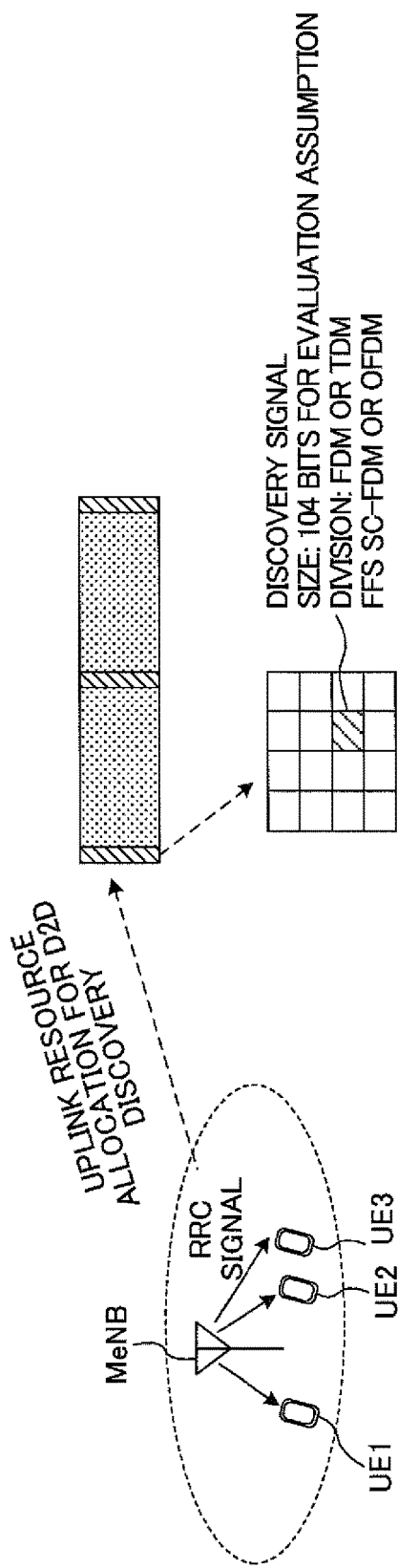

Alternatively, as shown in FIG. 15C, it is equally possible to group a plurality of user terminals by using the D2D (Device to Device) function. Here, the D2D function refers to the function of carrying out communication between user terminals without involving base stations. In this case, a user terminal identifies other neighbor user terminals by discovery signal transmission and detection processes between user terminals, and the macro base station groups a plurality of user terminals based on the result of this identification.

Also, the macro base station designates, for every user terminal that is grouped, a specific small cell and a specific CC not to overlap those of the other user terminals in the group. For example, as shown in FIG. 16, for the user terminal 1, the small cells 1 and 2 (PCI=1 and 2) and CC 1 are designated. Also, for the user terminal 2, the small cell 3 and CC 2 are designated. Also, for the user terminal 3, the small cell 4 and CC 3 are designated.

Also, as shown in FIG. 14, the macro base station transmits, to each user terminal in the group, measurement indication information that includes a measurement indication for the RSRP of a specific CC in a specific small cell and the RSSI of this specific CC (step S302a to 302c).

Each user terminal in the group measures the RSRP of a specific CC in a specific small cell, specified in the measurement indication information (step S303a to 303). Note that, although not shown, assume that the small base stations 1 to 3 each transmit the discovery signals of CC 1 to CC 3. For example, in the case illustrated in FIG. 16, the user terminal 1 measures $RSRP_{11}$ and $RSRP_{12}$ of CC 1 in the small cells 1 and 2. Also, the user terminal 2 measures $RSRP_{23}$ of CC 2 in the small cell 3. Also, the user terminal 3 measures $RSRP_{34}$ of CC 3 in the small cell 4.

Each user terminal in the group measures the RSSI of a specific CC that is specified in the measurement indication information (step S304a to 304c). For example, in the case illustrated in FIG. 16, the user terminal 1 measures $RSSI_1$ of CC 1, the user terminal 2 measures $RSSI_2$ of CC 2 and the user terminal 3 measures $RSSI_3$ of CC 3.

Each user terminal in the group transmits a measurement report, which includes the measured RSRP and RSSI, to the macro base station (step S305a to S305c). Note that the details of the RSRP and RSSI measurement process in the user terminals are the same as in step S103 and S104 of FIG. 8, and therefore description will be omitted.

The macro base station calculate the RSRQs of a plurality of CCs in each small cell based on the measurement reports from each user terminal in the group (step S306). For example, in the case illustrated in FIG. 16, the macro base station calculates $RSRQ_{11}$ and $RSRQ_{12}$ of CC 1 in the small cells 1 and 2, based on $RSRP_{11}$, $RSRP_{12}$ and $RSSI_1$ reported from the user terminal 1.

Also, the macro base station calculates $RSRQ_{21}$ and $RSRQ_{22}$ of CC 2 in the small cells 1 and 2, based on $RSRP_{11}$ and $RSRP_{12}$ reported from the user terminal 1 and $RSSI_2$ reported from the user terminal 2. Also, the macro base station calculates $RSRQ_{31}$ and $RSRQ_{32}$ of CC 3 in the small cells 1 and 2, based on $RSRP_{11}$ and $RSRP_{12}$ reported from the user terminal 1 and $RSSI_3$ reported from the user terminal 3.

Similarly, the macro base station calculates $RSRQ_{13}$, $RSRQ_{23}$ and $RSRQ_{33}$ of CC 1 to CC 3 in the small cell 3, based on $RSRP_{23}$ reported from the user terminal 2, and $RSSI_1$ to $RSSI_3$ reported from the user terminals 1 to 3. Also, the macro base station calculates $RSRQ_{14}$, $RSRQ_{24}$ and $RSRQ_{34}$ of CC 1 to CC 3 in the small cell 4, based on $RSRP_{34}$ reported from the user terminal 3 and $RSSI_1$ to $RSSI_3$ reported from the user terminals 1 to 3.

As described above, with the communication control method according to the third aspect, when a plurality of CCs are used in each small cell, one user terminal has only to measure and report the RSRP and RSRQ of a specific CC in a specific small cell, and, by this means, the macro base station can calculate the RSRQ of every small cell in all CCs. Consequently, compared to the case of measuring and reporting the RSRP and RSRQ of every small cell in all CCs, it is possible to reduce the load of measurements and the amount of information to report in the user terminal.

Figures 17A, 17B:
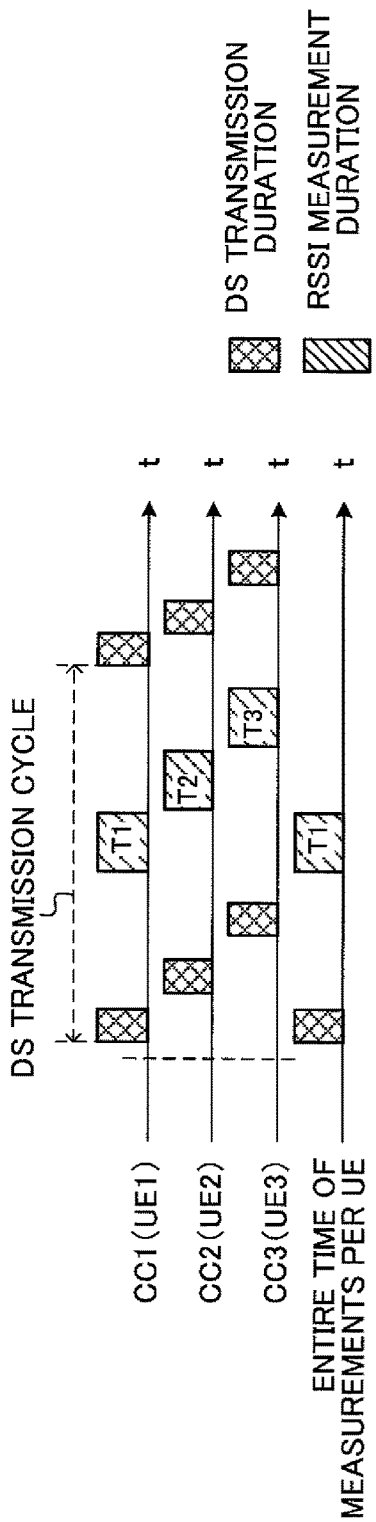
FIG. 17 provides diagrams to explain advantages of the communication control method according to the third aspect.

FIG. 17 provides diagrams to explain advantages of the communication control method according to the third aspect. As shown in FIG. 17A, with the communication control method according to the third aspect, the user terminal 1 measures $RSRP_{11}$ and $RSRP_{12}$ in the DS transmission durations of CC 1, and measures $RSSI_1$ in measurement duration T1, in which no discovery signal is transmitted. Also, the user terminal 2 measures $RSRP_{23}$ in the DS transmission durations of CC 2, and measures $RSSI_2$ in measurement duration T2, in which no discovery signal is transmitted. Also, the user terminal 3 measures $RSRP_{34}$ in the DS transmission durations of CC 3, and measures $RSSI_3$ in measurement duration T3, in which no discovery signal is transmitted.

By this means, one user terminal does not have to measure the RSRP and RSSI with respect to all CCs, so that it is possible to reduce the whole measurement time per user terminal and reduce the load of measurements. Note that, as shown in FIG. 10A, when $RSSI_1$ is measured in the DS transmission durations of CC 1 in FIG. 17A, in addition to $RSRP_{11}$ to $RSRP_{13}$, RSSI measurement duration T1 needs not be provided.

Also, as shown in FIG. 17B, with the communication control method according to the third aspect, each user terminal in the group has only to report the RSRP and RSSI assigned to the subject terminal. For example, in the case illustrated in FIG. 16, the total of two RSRPs and one RSSI reported from the user terminal 1 is the maximum amount of information to report. Here the RSSI carries a smaller amount of information than the RSRQ. Consequently, with the communication control method according to the third aspect, it is possible to make the amount of information to report smaller than in release 11.

(Structure of Radio Communication System)

Now, an example of a radio communication system according to the present embodiment will be described in detail below. In this radio communication system, the above-described communication control methods of the first to third aspects are employed. Assume that, in the following radio communication system, discovery signals are used as measurement signals. Furthermore, the RSRP will be used as the received power of the measurement signals, the RSSI will be used as total received power and the RSRQ will be used as the received quality of the measurement signals, but these are by no means limiting.

Figure 18:
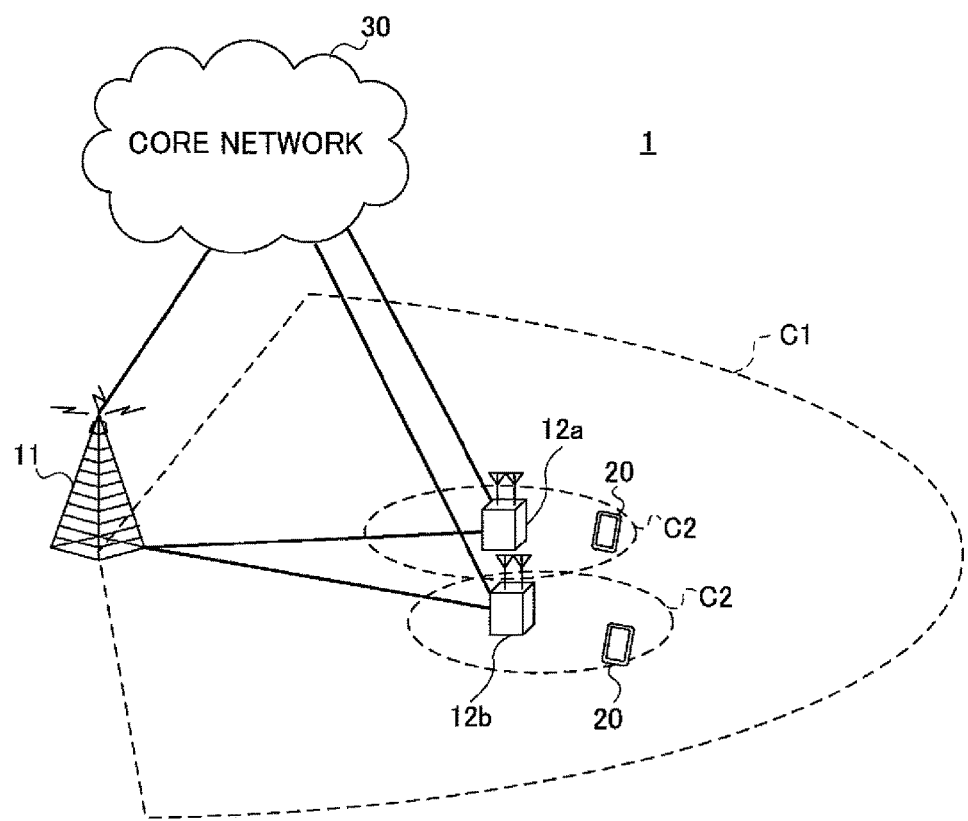
FIG. 18 is a schematic diagram to show an example of a radio communication system according to the present embodiment.

FIG. 18 is a diagram to show a schematic configuration of the radio communication system according to the present embodiment. As shown in FIG. 18, the radio communication system 1 includes a macro base station 11, which forms a macro cell C1, and small base stations 12a and 12b, which are placed within the macro cell C1 and which form small cells C2 that are narrower than the macro cell C1. Also, user terminals 20 are placed in the macro cell C1 and in each small cell C2. Note that the numbers of macro cells C1 (macro base stations 11), small cells C2 (small base stations 12) and user terminals 20 are not limited to those shown in FIG. 18.

Also, user terminals 20 are placed in the macro cell C1 and in each small cell C2. The user terminals 20 are configured to be able to perform radio communication with the macro base station 11 and/or the small base stations 12.

Between the user terminals 20 and the macro base station 11, a relatively low frequency band F1 (for example, 2 GHz) is used. On the other hand, between the user terminals 20 and the small base stations 12, a relatively high frequency band F2 (for example, 3.5 GHz) is used. Note that a plurality of frequency bands (component carriers) may be used in the small base stations. Also, the same frequency band may be used between the macro base station 11 and the small base stations 12.

Also, the macro base station 11 and each small base station 12 may be connected via a channel of relatively low speed such as the X2 interface (non-ideal backhaul), may be connected via a channel of relatively high speed (low delay) such as optical fiber (ideal backhaul), or may be connected via radio. Also, the small base stations 12 may be connected via a channel of relatively low speed such as the X2 interface (non-ideal backhaul), may be connected via a channel of relatively high speed such as optical fiber (ideal backhaul), or may be connected via radio.

The macro base station 11 and the small base stations 12 are each connected with a core network 30. In the core network 30, core network devices such as an MME (Mobility Management Entity), an S-GW (Serving-GateWay), a P-GW (Packet-GateWay) and so on are provided.

Also, the macro base station 11 is a radio base station having a relatively wide coverage, and may be referred to as an "eNodeB," a "macro base station," an "aggregation node," a "transmission point," a "transmitting/receiving point" and so on. The small base stations 12 are radio base stations that have local coverages, and may be referred to as "small base stations," "pica base stations," "femto base stations," "HeNBs (Home eNodeBs)," "RRHs (Remote Radio Heads)," "micro base stations," "transmission points," "transmitting/receiving points" and so on.

Also, if no distinction is made between the macro base station 11 and the small base stations 12, these will be collectively referred to as the "radio base station 10." The user terminals 20 are terminals to support various communication schemes such as LTE and LTE-A, and may not only cover mobile communication terminals, but may also cover stationary communication terminals as well.

Also, in the radio communication system 1, a physical downlink shared channel (PDCCH: Physical Downlink Shared Channel), which is used by each user terminal 20 on a shared basis, physical downlink control channels (PDCCH (Physical Downlink Control Channel), EPDCCH (Enhanced Physical Downlink Control Channel), a physical broadcast channel (PBCH) and so on are used as downlink physical channels. User data and higher layer control information are communicated by the PUSCH. Downlink control information (DCI) is communicated by the PDCCH and the EPDCCH.

Also, in the radio communication system 1, a physical uplink shared channel (PUSCH: Physical Uplink Shared Channel), which is used by each user terminal 20 on a shared basis, a physical uplink control channel (PUCCH: Physical Uplink Control Channel) and so on are used as uplink physical channels. User data and higher layer control information are communicated by the PUSCH. Also, by means of the PUCCH, downlink radio quality information (CQI: Channel Quality Indicator), delivery acknowledgement information (ACK/NACK) and so on are communicated.

Figure 19:
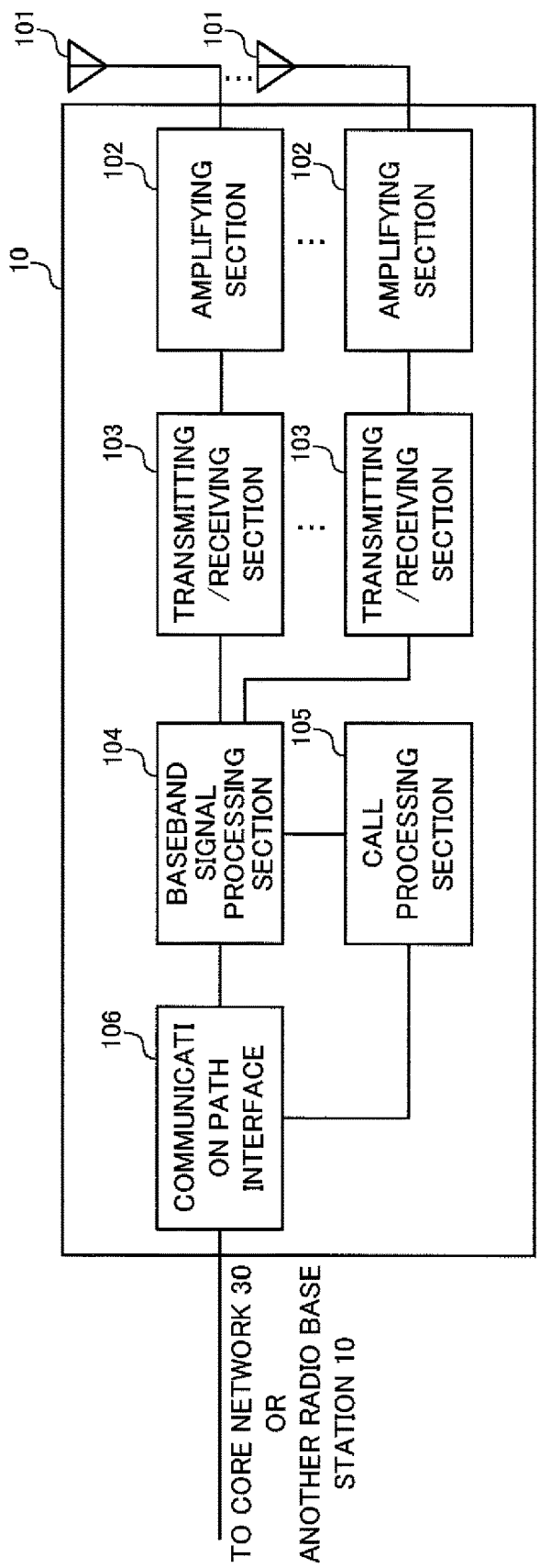
FIG. 19 is a diagram to show an overall structure of a radio base station according to the present embodiment.

Now, overall structures of a radio base station 10 (which may be either a macro base station 11 or a small base station 12) and a user terminal 20 will be described with reference to FIGS. 19 and 20. FIG. 19 is a diagram to show an overall structure of the radio base station 10. As shown in FIG. 19, the radio base station 10 has a plurality of transmitting/receiving antennas 101 for MIMO communication, amplifying sections 102, transmitting/receiving sections (transmitting section and receiving section) 103, a baseband signal processing section 104, a call processing section 105, and a communication path interface 106.

User data to be transmitted from the radio base station 10 to the user terminal 20 on the downlink is input from the S-GW provided in the core network 30, into the baseband signal processing section 104, via the communication path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a pre-coding process are performed, and the result is forwarded to each transmitting/receiving section 103. Furthermore, downlink control signals (including reference signals, synchronization signals, broadcast signals, etc.) are also subjected to transmission processes such as channel coding and an inverse fast Fourier transform, and are forwarded to each transmitting/receiving section 103.

Each transmitting/receiving section 103 converts the downlink signals, which are pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101.

On the other hand, as for uplink signals, radio frequency signals that are received in the transmitting/receiving antennas 101 are each amplified in the amplifying sections 102, converted into baseband signals through frequency conversion in each transmitting/receiving section 103, and input into the baseband signal processing section 104.

In the baseband signal processing section 104, the user data that is included in the input uplink signals is subjected to an FFT process, an IDFT process, error correction decoding, a MAC retransmission control receiving process and RLC layer and PDCP layer receiving processes, and the result is forwarded to the core network 30 via the communication path interface 106. The call processing section 105 performs call processing such as setting up and releasing communication channels, manages the state of the radio base stations 10 and manages the radio resources.

Figure 20:
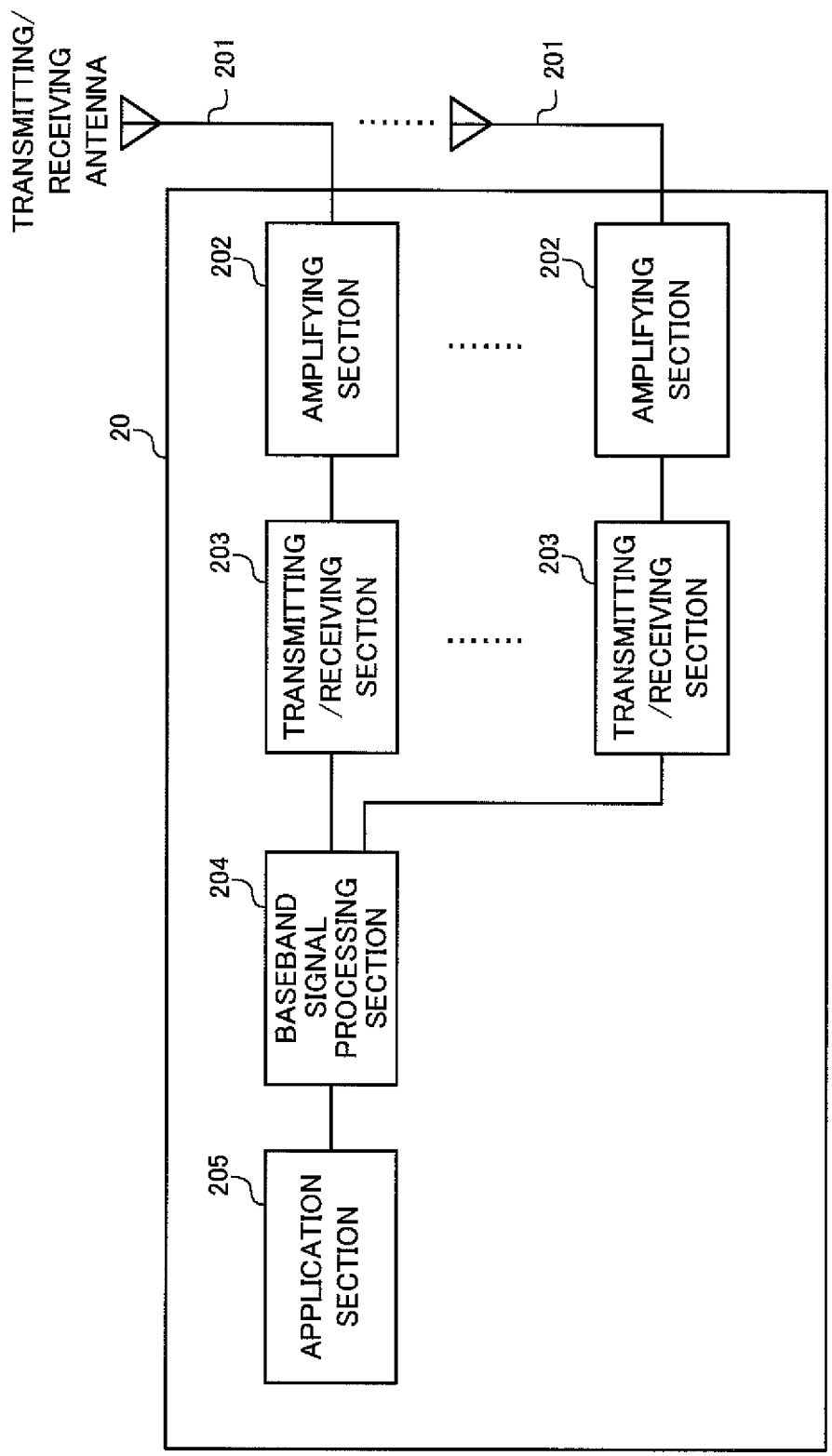
FIG. 20 is a diagram to show an overall structure of a user terminal according to the present embodiment.

FIG. 20 is a diagram to show an overall structure of a user terminal 20 according to the present embodiment. The user terminal 20 has a plurality of transmitting/receiving antennas 201 for MIMO communication, amplifying sections 202, transmitting/receiving sections (receiving section and transmitting section) 203, a baseband signal processing section 204 and an application section 205. Note that the user terminal 20 may switch the receiving frequency using one receiving circuit (RF circuit), or may have a plurality of receiving circuits.

As for downlink signals, radio frequency signals that are received in a plurality of transmitting/receiving antennas 201 are each amplified in the amplifying sections 202, subjected to frequency conversion in the transmitting/receiving sections 203, and input in the baseband signal processing section 204. In the baseband signal processing section 204, an FFT process, error correction decoding, a retransmission control receiving process and so on are performed. The user data that is included in the downlink signals is forwarded to the application section 205. The application section 205 performs processes related to higher layers above the physical layer and the MAC layer. Furthermore, the broadcast information in the downlink data is also forwarded to the application section 205.

Meanwhile, uplink user data is input from the application section 205 into the baseband signal processing section 204. The baseband signal processing section 204 performs a retransmission control (HARQ (Hybrid ARQ)) transmission process, channel coding, pre-coding, a DFT process, an IFFT process and so on, and the result is forwarded to each transmitting/receiving section 203. Baseband signals that are output from the baseband signal processing section 204 are converted into a radio frequency band in the transmitting/receiving sections 203. After that, the amplifying sections 202 amplify the radio frequency signals having been subjected to frequency conversion, and transmit the result from the transmitting/receiving antennas 201.

Figure 22:
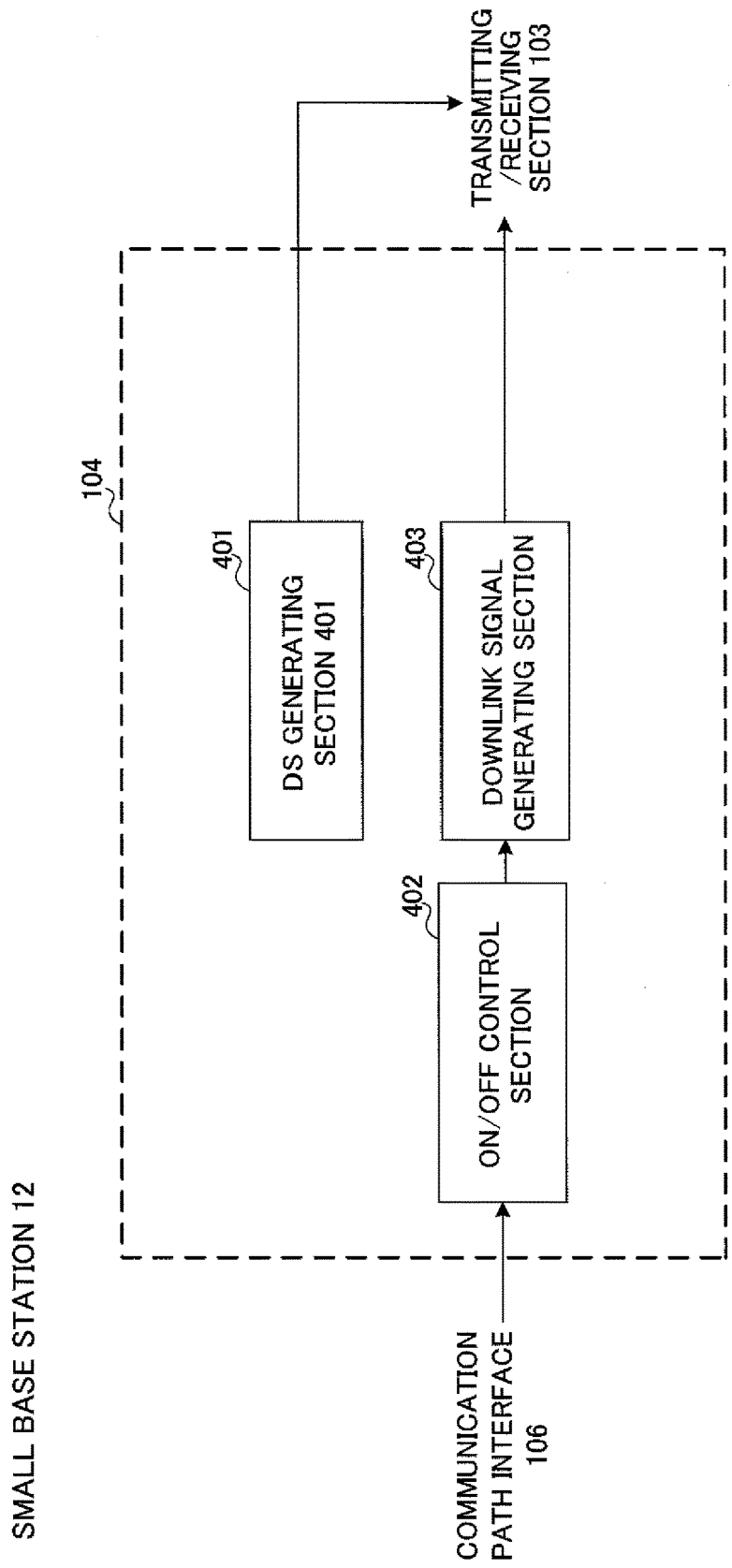
FIG. 22 is a diagram to show a functional structure of a small base station according to the present embodiment.
Figure 23:
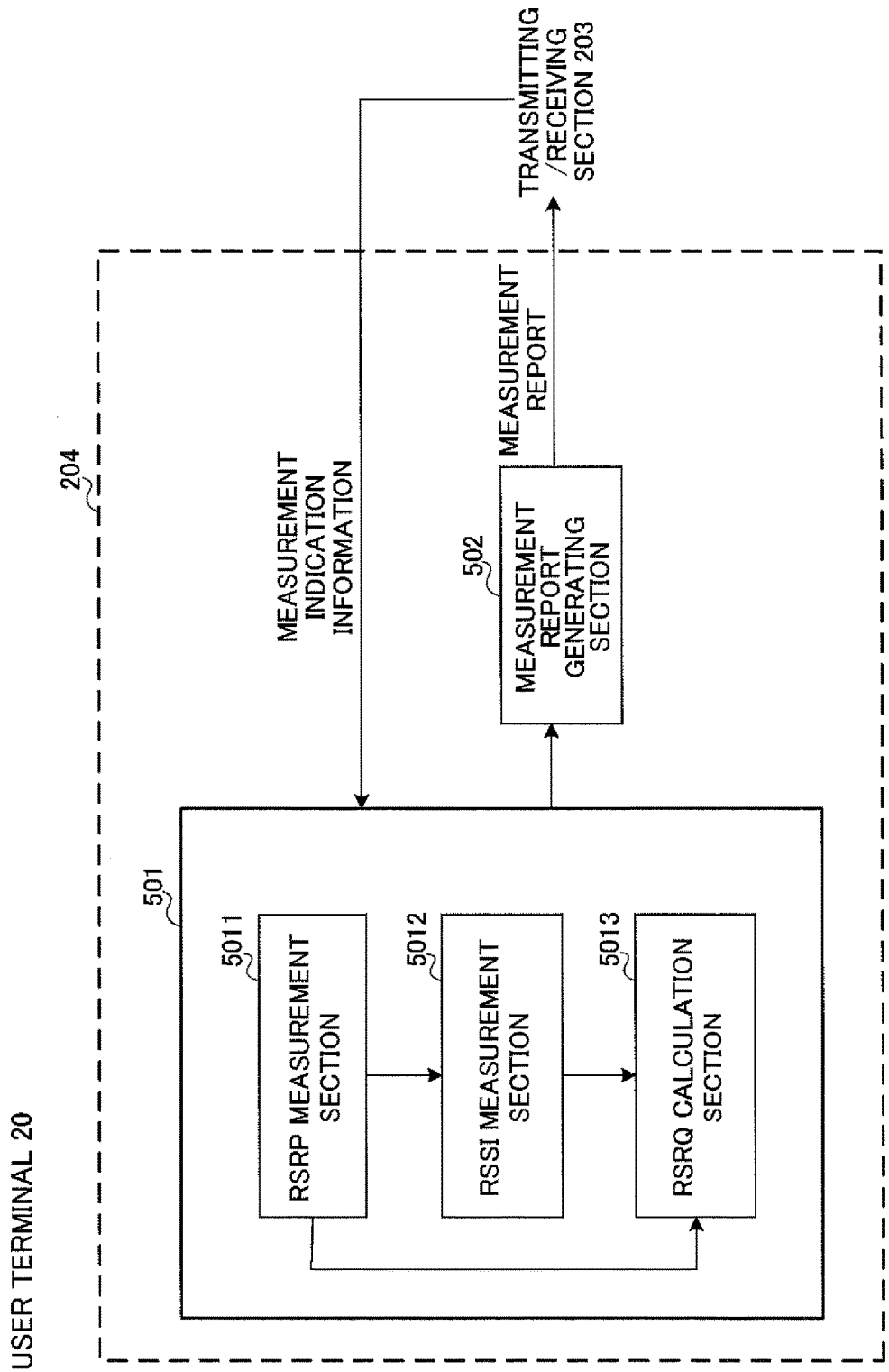
FIG. 23 is a diagram to show a functional structure of a user terminal according to the present embodiment.

Next, functional structures of a macro base station 11, a small base station 12 and a user terminal 20 will be described in detail with reference to FIG. 21 to FIG. 23. The functional structures of the macro base station 11 shown in FIG. 21 and the small base station 12 shown in FIG. 22 are primarily formed with a baseband signal processing section 104. Also, the functional structure of the user terminal 20 shown in FIG. 23 is primarily formed with the baseband signal processing section 204.

Figure 21:
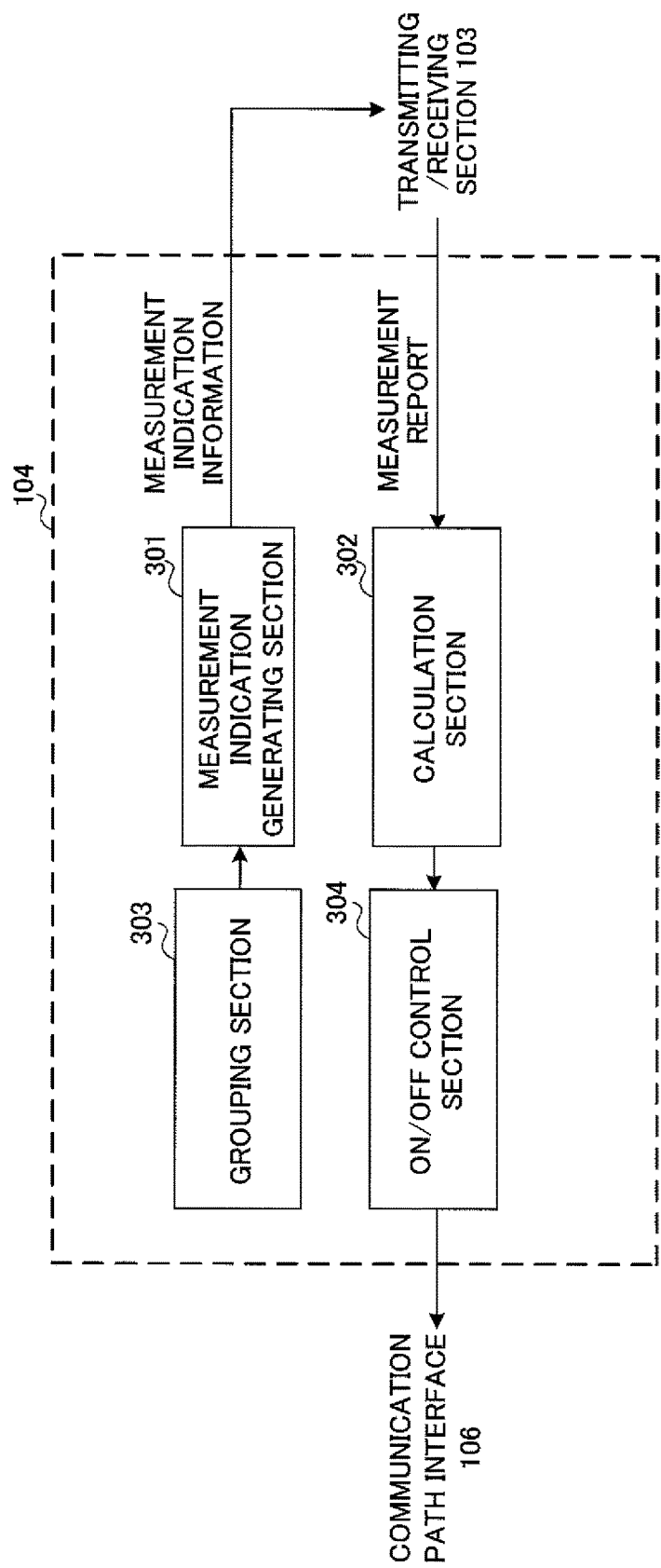
FIG. 21 is a diagram to show a functional structure of a macro base station according to the present embodiment.

FIG. 21 is a diagram to show a functional structure of a macro base station 11 according to the present embodiment. As shown in FIG. 21, the macro base station 11 has a measurement indication generating section 301, a calculation section 302, a grouping section 303 and an on/off control section 304. Note that the grouping section 303 may be omitted in the first aspect and second aspect of the present invention.

The measurement indication generating section 301 generates measurement indication information that includes measurement indications for the user terminal 20. The measurement indication information here may include a measurement indication for the RSRP of a specific CC and the RSSI of a specific CC (first aspect). Alternatively, the measurement indication information may contain a measurement indication for the RSRP and RSRQ of a specific CC (second aspect). Alternatively, the measurement indication information may contain a measurement indication for the RSRP of a specific CC in a specific small cell C2, which are assigned in the grouping section 303 to be described later, and the RSSI of this specific CC (third aspect).

The measurement indication information measured in the measurement indication generating section 301 is input in the transmitting/receiving section 103 and transmitted to the user terminal 20. Note that the measurement indication information may be transmitted by using higher layer signaling such as RRC signaling, by broadcast information, and so on.

A measurement report is input in the calculation section 302 from the transmitting/receiving section 103. The calculation section 302 calculates the RSRQs of a plurality of CCs based on the RSRP of a specific CC included in the measurement report. Also, according to the first aspect, the measurement report includes the RSSIs of a plurality of CCs in addition to the RSRP of a specific CC. According to the first aspect, based on the RSRP of this specific CC (for example, CC 1) and the RSSIs of a plurality of CCs (for example, CC 1 to CC 3) included in the measurement report, the calculation section 302 calculates the RSRQs of these plurality of CCs (see FIG. 9B).

Also, according to the second aspect, the measurement report contains, in addition to the RSRP of a specific CC in each small cell C2, the RSRQ of this specific CC. With the second aspect, based on the RSRP of a specific CC (for example, CC 1) in each small cell C2 and the on/off states of other CCs (for example, CC 2 and CC 3), the calculation section 302 calculates the RSSIs of these other CCs. Based on the RSRP of the specific CC (for example, CC 1) and the RSSIs of other CCs (for example, CC 2b and CC 3) calculated, the calculation section 302 calculates the RSRQs of these other CCs (see FIGS. 12B and 12C).

Also, according to the second aspect, based on the RSRP of a specific CC (for example, CC 1) in each small cell C2 and the RSRQ of this specific CC, the calculation section 302 may calculate the RSSI of this specific CC. In this case, based on the RSRP of a specific CC in each small cell C2 and the on/off state of this specific CC, the calculation section 302 calculates the RSSI of this specific CC. The calculation section 302 may correct the RSSIs of other CCs (for example, CC 2 and CC 3) based on a comparison result of the calculated RSSIs of the two.

Also, according to the third aspect, measurement reports from user terminals 20 in the group each contain the RSRP of a specific CC in mutually different specific small cells C2, and the RSSI of this specific CC. According to the third aspect, based on the RSRP of a specific CC (for example, CC 1) reported from a given user terminal 20 and the RSSI of this specific CC, the calculation section 302 calculates the RSRQ of this specific CC (see FIG. 16). Also, based on the RSRP of a specific CC reported from a given user terminal 20 and the RSSIs of other CCs reported from other user terminals 20, the calculation section 302 calculates the RSRQs of these other CCs (see FIG. 16).

The grouping section 303 groups a plurality of user terminals 20 that are located within a predetermined area. Note that a plurality of user terminals 20 may be grouped by using location information from GNSS, GPS and so on (FIG. 15A). Alternatively, a plurality of user terminals 20 may be grouped based on the received quality of measurement signals (for example, CRS, CSI-RS, PSS, SSS, etc.) from the macro base station 11 (FIG. 15B). Alternatively, a plurality of user terminals 20 may be grouped based on the D2D function (FIG. 15C).

Also, for each user terminal in the group, the grouping section 303 designates a specific small cell C2 and a specific CC not to overlap those of the other user terminals in the group. Also, the grouping section 303 outputs the designated results to the measurement indication generating section 301.

The on/off determining section 304 determines the on/off state of each small cell C2, on a per CC basis, based on the calculation results in the calculation section 302. Also, the on/off determining section 304 reports the determined results to the small base station 12.

FIG. 22 is a diagram to show a functional structure of a small base station 12 according to the present embodiment. As shown in FIG. 22, the small base station 11 has a discovery signal (DS) generating section 401, an on/off control section 402 and a downlink signal generating section 403.

The DS generating section 401 generates discovery signals on a per CC basis, and maps these signals to predetermined radio resources (for example, time resources such as subframes and OFDM symbols, frequency resources such as resource blocks, and so on).

The discovery signals that are generated are input in the transmitting/receiving section 103, and are transmitted in DS transmission durations, which repeat in a DS transmission cycle. As mentioned earlier, the DS transmission cycle is a longer transmission cycle than that of CRSs and others. Note that the discovery signals may be transmitted in different DS transmission durations on a per CC basis (see FIG. 7A), or may be transmitted in the same DS transmission durations between CCs (see FIG. 7B). Also, the discovery signals may be transmitted synchronously between neighboring small base stations 12 (see FIG. 6).

Note that DS configuration information, which includes DS transmission durations, DS transmission cycle, DS transmission duration starting offsets, sequence pattern and so on may be reported from the small base station 12 to the user terminal, or may be reported from the macro base station 11 to the user terminal 20.

The on/off control section 402 controls the on/off state of the small base station 12 based on commands from the macro base station 11.

If the small base station 12 is in the on state, the downlink signal generating section 403 generates downlink signals and maps these to predetermined radio resources. The downlink signals may include data (PDSCH) signals, CRSs, CSI-RSs, SSS/PSS and so on. On the other hand, if the small base station 12 is in the off state, the downlink signal generating section 403 stops generating downlink signals. By this means, the power consumption of the small base station 12 can be reduced during the off state.

FIG. 23 is a diagram to show a functional structure of a user terminal 20 according to the present embodiment. As shown in FIG. 23, the user terminal 20 has a measurement section 501 and a measurement report generating section 502. The measurement section 501 has an RSRP measurement section 5011, an RSSI measurement section 5012 and an RSRQ calculation section 5013. Note that the RSRQ calculation section 5013 may be removed in the first and third aspects.

The RSRP measurement section 5011 measures the RSRP of a specific CC specified in measurement indication information. To be more specific, the RSRP measurement section 5011 measures the RSRP by using discovery signals transmitted in the DS transmission durations. Note that the DS transmission durations are specified by DS configuration information that is reported from the macro base station 11.

Also, the RSRP measurement section 5011 may measure the RSRP in each small cell C2 (the first and second aspects), or measure the RSRP in a specific small cell C2 specified in measurement indication information (the third aspect).

The RSSI measurement section 5012 measure the RSSI specified in the measurement indication information. To be more specific, the RSSI measurement section 5012 may measure the RSSIs of a plurality of CCs (for example, CC 1 to CC 3) (the first aspect, see FIG. 10A). Alternatively, the RSSI measurement section 5012 may measure the RSSI of a specific CC (the second and third aspects, see FIG. 13A and FIG. 17A).

Alternatively, the RSSI measurement section 5012 measure the RSSI in measurement durations in which no discovery signal is transmitted (for example, in measurement durations T1 to T3 in FIGS. 10A, 13A and FIG. 17A). This is because if the RSSI is measured in durations in which discovery signals are transmitted (DS transmission durations), the load of the small cell C2 is not mirrored.

The RSRQ calculation section 5013 calculates the RSRQ based on the RSRP measured in the RSRP measurement section 5011 and the RSSI measured in the RSSI measurement section 5012. To be more specific, based on the RSRP of a specific CC in each small cell C2 and the RSRQ of this specific CC, the RSRQ calculation section 5013 may calculate the RSRQ of a specific CC in each small cell C2 by, for example, above equation 1 (the second aspect).

The measurement report generating section 502 generates a measurement report, which contains the measurement results in the measurement section 501, to the transmitting/receiving section 203. Note that the measurement report is reported to the macro base station 11 by using higher layer signaling such as RRC signaling.

To be more specific, the measurement report generating section 502 may generate a measurement report that includes the RSRP of specific CC measured in the RSRP measurement section 5011 and the RSSIs of a plurality of CCs measured in the RSSI measurement section 5012 (the first aspect). Also, the measurement report generating section 502 may generate a measurement report that includes the RSRQ of a specific CC calculated in the RSRQ calculation section 5013, in addition to the RSRP of a specific CC measured in the RSRP measurement section 5011 (the second aspect). Also, the measurement report generating section 502 may generate a measurement report that includes the RSRP of a specific CC in a specific small cell C2 measured in the RSRP measurement section 5011, and the RSSI of a specific CC measured in the RSSI measurement section 5012 (the third aspect).

In the radio communication system 1 according to the present embodiment, the macro base station 11 assumes that the RSRP of a specific CC in a given small cell C2 is the same as the RSRPs of other CCs, so that the user terminal 20 has only to measure and report the RSRP of a specific CC. Consequently, compared to the case of measuring and reporting the RSRPs of all CCs, it is possible to reduce the load of measurements and the amount of information to report in the user terminal 20.

Note that, in the radio communication system 1, measurement indication information is reported from the macro base station 11 to the user terminal 20, but may be reported from any device provided on the network side (for example, a small base station 12 and/or the like). Also, the measurement report is reported from the user terminal 20 to the macro base station 11, but may be reported from any device provided on the network side (for example, a small base station 12).

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention. That is to say, the description herein is provided only for the purpose of explaining examples, and should by no means be construed to limit the present invention in any way.

The disclosure of Japanese Patent Application No. 2013-199190, filed on Sep. 26, 2013, including the specification, drawings and abstract, is incorporated herein by reference in its entirety.

The invention claimed is:

1. A user terminal comprising:
a processor that measures RSRP (Reference Signal Received Power) of a specific component carrier (CC) by using a discovery signal and measures RSSI (Received Signal Strength Indicator) of at least one CC; and
a transmitter that transmits a measurement report including the RSRP of the specific CC and the RSSI of the at least one CC,
wherein the processor measures the RSRP of the specific CC during a transmission duration of the discovery signal, the transmission duration being set based on configuration information from a radio base station, and
the processor measures the RSSI of the at least one CC during a measurement duration, the measurement duration being set based on measurement duration information from the radio base station apart from the transmission duration of the discovery signal.

2. The user terminal according to claim 1, wherein the processor measures the RSSI of the at least one CC based on measurement indication information from the radio base station.

3. The user terminal according to claim 1, wherein the processor measures the RSRP of the specific CC for each cell by using the discovery signal of each cell and measures the RSSI of the at least one CC for each CC.

4. The user terminal according to claim 2, wherein the processor measures the RSRP of the specific CC for each cell by using the discovery signal of each cell and measures the RSSI of the at least one CC for each CC.

5. A radio base station comprising:
a transmitter that transmits a discovery signal; and
a receiver that receives a measurement report including RSRP (Reference Signal Received Power) of a specific component carrier (CC) measured by a user terminal with use of a discovery signal and RSSI (Received Signal Strength Indicator) of at least one CC measured by the user terminal,
wherein the transmitter transmits configuration information used to set a transmission duration of the discovery signal and measurement duration information that is used to set a measurement duration apart from the transmission duration of the discovery signal, and the RSRP of the specific CC is measured during the transmission duration and the RSSI of the at least one CC is measured during the measurement duration.

6. The radio base station according to claim 5, further comprising a processor that calculates RSRQ (Reference Signal Received Quality) of the at least one CC based on the RSRP of the specific CC and the RS SI of the at least one CC.

7. A communication control method for a user terminal, comprising:

measuring RSRP (Reference Signal Received Power) of a specific component carrier (CC) by using a discovery signal and measuring RSSI (Received Signal Strength Indicator) of at least one CC; and transmitting a measurement report including the RSRP of the specific CC and the RSSI of the at least one CC, wherein the user terminal measures the RSRP of the specific CC during a transmission duration of the discovery signal, the transmission duration being set based on configuration information from a radio base station, and the user terminal measures the RSSI of the at least one CC during a measurement duration, the measurement duration being set based on measurement duration information from the radio base station apart from the transmission duration of the discovery signal.

* * * * *